United States Patent Office 3,560,229

Patented Feb. 2, 1971

3,560,229

COLORFORMING COMPOSITIONS AND METHODS FOR PREPARING AND CONTROLLING SAME

Norman W. Farnham, Webster, and Earl J. Gosnell, Rochester, N.Y., assignors to Burroughs Corporation, Detroit, Mich., a corporation of Michigan No Drawing. Continuation-in-part of application Ser. No. 526,342, Feb. 10, 1966, which is a continuation-in-part of applications Ser. No. 135,294, and Ser. No. 135,314, Aug. 31, 1961. This application May 15, 1969, Ser. No. 825,036

Int. Cl. C09d *11/00*

U.S. Cl. 106—21 10 Claims

ABSTRACT OF THE DISCLOSURE

The present invention relates to novel colorforming compositions. In particular, the invention relates to colorforming compositions including colorless or light colored chromogenous lactone compounds and reactive phenolic compounds, and methods for preparing the compositions and for the control of the appearance and stability of color in the presence of heat or water by the inclusion of certain organic solvents in the colorforming composition.

The present application is a continuation-in-part of application Ser. No. 526,342, filed Feb. 10, 1966, now abandoned which was a continuation-in-part of application Ser. No. 135,294, filed Aug. 31, 1961, now U.S. Pat. 3,244,549, and of application Ser. No. 135,314, filed Aug. 31, 1961, now U.S. Pat. 3,244,550.

BACKGROUND OF THE INVENTION

Some of the objects of the present invention are to provide a colorforming composition which is particularly useful in manifolding and duplicating operations. The invention has special utility in the preparation of identifiable and alteration-proof checks, tickets, money orders, stamps and the like, and inks for heat-controlled markings and duplications. The invention may be used in the fields of copying, duplication, safety and security papers, and has special characteristics in areas of technology where it is desired to control the formation of color in response to temperature and moisture.

SHORT STATEMENT OF THE INVENTION

The invention provides colorforming compositions including a colorless or light-colored chromogenous compound which includes as its major functional arrangement the molecular structure

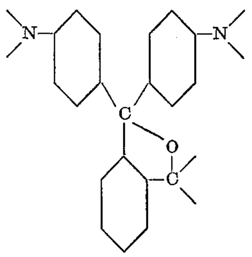

and a colorless or light-colored reactive phenolic compound. The appearance, disappearance and/or permanency of an intense color developable from the colorless or light colored composition can be controlled in the presence of heat or water, by the inclusion of a predetermined organic solvent in the colorforming composition.

The invention also provides methods of preparing the compositions and for controlling the appearance, disappearance, and/or permanency of a developable color including the step of contacting a colorless or light colored chromogenous compound which includes as its major functional arrangement the molecular structure

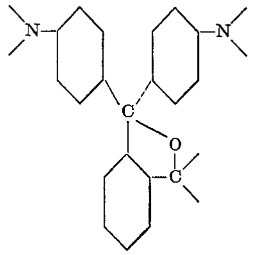

with one of certain colorless or light-colored phenolic compounds. The method also includes the step of selectively applying heat or water to the resulting composition which may include a selected organic solvent, to control the appearance, disappearance, and/or permanency of the intense color developable from the resulting composition.

The above-mentioned colorless or light-colored chromogenous compound may be selected from the chromogenous compounds originally described in applications Ser. Nos. 135,294 and 135,314, and set forth hereinafter.

The above-mentioned colorless or light-colored phenolic compound may be selected from magnesium pentachlorophenate or the phenolic compounds originally described in applications Ser. Nos. 135,294 and 135,314 and set forth hereinafter.

The selected organic solvent may be a glycol, a glycol ether, a halogenated biphenyl or biphenyl ether, an aromatic or aliphatic ester type plasticizer, and other solvent media of low vapor pressure, according to the specific effect desired, as hereinafter described.

DETAILED DESCRIPTION OF THE PREFERRED EMBODIMENT

The colorless or light colored chromogenous compound of applicant's colorforming composition includes as its major functional arrangement the molecular structure

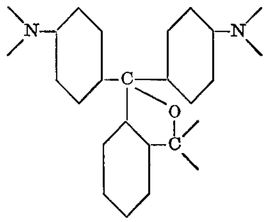

having a p-amino-substituted triphenylmethane group with a bond from the methane carbon atom thereof to the heterocyclic oxygen atom. It will be understood that substituents may be present on the benzene rings in this compound provided that the illustrated structure remains the effective major functional arrangement in the compound.

When compounds of this molecular structure are placed or forced in intimate contact with a reactive phenolic color-activating material, as described in detail herein, an intense dark color will be produced by the action of the phenolic compound in opening the bond from the central methane carbon atom to the heterocyclic oxygen atom to permit quinonoid resonance in the chromogenous compound. However the appearance of such color, and its stability in the presence of heat and water can be controlled by the addition of certain organic solvents specific to the effect desired. The proportions of chromogenous compound and phenolic compounds are in no sense critical, since only the intensity of color is affected by the relative amount of chromogenous compound included.

Reference now will be made again to the chromogenous compound, before it is acted upon by the color-activating substance, having the major functional arrangement involving the molecular structure, shown hereinabove, with a p-amino-substituted triphenylmethane group and a heterocyclic ring; the methane carbon atom of the triphenylmethane group has a bond to the hetero oxygen atom, which in turn is bonded to a carbon atom affixed to one of the phenyl groups in the ortho position. This molecular structure is included with the minimum of substituents in the compound 1,1-bis(p-aminophenyl) phthalan. The latter compound is represented by the structural formula

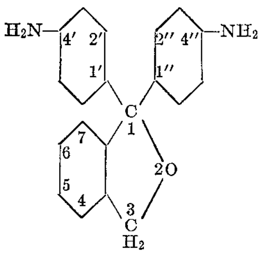

The colorless or lightly colored chromogenous compound preferably is selected from the group consisting of the last-mentioned compound, the 2′,2″-epoxy, 3-oxo, and 2′,2″-epoxy-3-oxo derivatives thereof, bifunctional derivatives of each of these compounds having a second heterocyclic ring

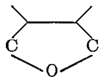

fused to the 5,6 side of the benzene nucleus and similarly carrying extracyclic substituents the same as those carried by the carbon atoms designated 1 and 3, the 5-amino derivatives of the 1,1-bis(p-aminophenyl)phthalan and of the above-mentioned epoxy and oxo derivatives thereof, and N-substituted derivatives of each of the compounds here listed in which each individual substituent for an amino hydrogen atom is selected from the group consisting of an alkyl radical of not more than four carbon atoms, the benzyl radical, and the phenyl radical.

Each of these compounds can be seen to include as its major functional arrangement the molecular structure set forth hereinabove, with hydrogen atoms or appropriate substituents on the amino nitrogen atoms and on the available heterocyclic carbon atom, and with or without other substituents, such as the epoxy linkage and the third p-amino radical, or such as the bifunctional arrangement involving a second bis(p-aminophenyl)methyl group and a second heterocyclic ring fused with the 5,6 side of the benzene nucleus. The N-substituted derivatives of the several compounds listed above are by far the most important members of this group of chromogenous compounds. Examples of the chromogenous substances having particular utility in connection with the present invention will be given now.

Turning first to the 1,1-bis(p-aminophenyl)phthalan itself, its structural formula may be redrawn as follows:

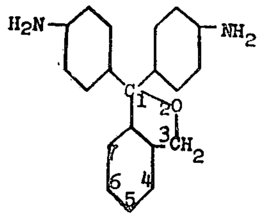

It may be used, preferably dissolved in a lipophilic solvent, to develop a violet color when brought into contact with a phenolic color-activating or developer substance.

However, it is preferred to provide related chromogenous compounds in which at least one of the two hydrogen atoms in each amino radical is replaced by a substituent tending to increase the color intensity or modify the hue of the dark-colored material which may be formed from the chromogenous compound. Thus the corresponding N-monosubstituted compound 1,1-bis(p-ethylaminophenyl)phthalan develops a greenish blue color of greater intensity, while the N-disubstituted compound 1,1-bis(p-dimethylaminophenyl)phthalan forms a still more intensely colored quinonoid form with a green, or somewhat bluish green, hue. The compound 1,1-bis(p-diethylaminophenyl)phthalan produces an intense, green dark-colored form in contact with the phenolic developer substances, and similar dark-colored forms may be obtained, for example, from similar compounds having diisopropylaminophenyl and dibutylaminophenyl groups. These compounds illustrate the selection of one or more of the individual N-substitutents, that is, substituents for the amino hydrogen atoms, from the alkyl radicals of not more than four carbon atoms. In general, more intense and more stable colors may be obtained when there are substituents replacing most or all of the amino hydrogen atoms. Moreover, instead of these N-alkyl-substituted compounds, the benzyl-substituted compounds 1,1-bis(p-benzylaminophenyl)phthalan and 1,1-bis(p-dibenzylaminophenyl)phthalan may be used to obtain dark greenish blue quinonoid forms. As an example of an alternative derivative, having N-phenyl substitutents, there may be mentioned 1,1-bis(p-N-methylanilinophenyl)phthalan, having methyl and phenyl radicals on each nitrogen atom, which gives a somewhat yellowish green colored form.

The 5-amino derivative of 1,1-bis(p-aminophenyl) phthalan having the structural formula

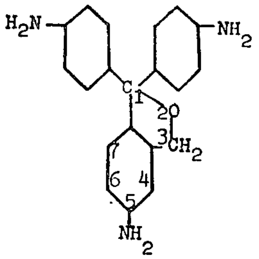

may be brought into contact with an active phenolic developer material to produce a violet-red or bluish red dark-colored form of fair intensity. A deeper, bluish violet-colored substance may be produced from 5-amino-1,1-bis(p-methylaminophenyl)phthalan.

Among the more preferred 5-amino derivatives of 1,1-bis(p-aminophenyl)phthalan, however, may be mentioned 5-dimethylamino-1,1-bis(p-dimethylaminophenyl) phthalan, forming a bluish violet quinonoid substance. Another N-substituted modification of the 5-amino derivative is, for example, 5-anilino-1,1-bis(p-anilinophenyl) phthalan, which has three N-monophenyl-substituted amino groups and gives greenish blue to blue dark-colored quinonoid materials.

It will appear that N-substituted 1,1-bis(p-aminophenyl) phthalan and 6-amino-1,1-bis(p-aminophenyl)phthalan compounds are particularly desirable for use in systems in which white or light-colored chromogenous compounds are converted to dark-colored forms. Thus, for such use there may be provided advantageously a colorless or lightly colored chromogenous compound having a modified 1,1-diphenylphthalan structural formula

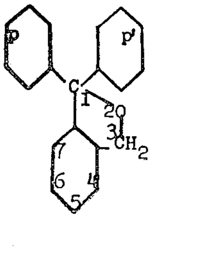

which includes the three points, designated thereon the p,p',5-positions, each para to the position of a bond to the methane carbon atom occupying the 1-position, and which is modified by the inclusion of an amino radical in at least the first-mentioned two of the three p,p'5-positions. Each such amino radical furthermore has at least one substituent selected individually from the group consisting of an alkyl radical of not more than four carbon atoms, the benzyl radical, and the phenyl radical. When the first-mentioned two p,p'-positions carry such amino radicals, the compound is a 1,1-bis(p-aminophenyl) phthalan with one or two substituents for the hydrogen atoms in each amino radical. When all three p,p',5-positions carry such amino radicals, the compound is, of course, an N-substituted 5-amino-1,1-bis(p-aminophenyl) phthalan.

Turning now to the 2',2''-epoxy derivative of 1,1-bis(p-aminophenyl)phthalan, this derivative without further substituents is 3',6'-diaminospiro(phthalan-1,9'-xanthene) having the structural formula

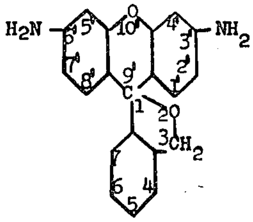

This compound develops a generally red or bluish red color upon contact with various phenolic developers. However, a colorless or lightly colored chromogenous compound is preferred in the form of a substituted 3',6'-diaminospiro(phthalan-1,9'-xanthene)compound, having the structural formula shown just above, in which each of the amino radicals also has at least one substituent selected individually from the group consisting of an alkyl radical of not more than four carbon atoms, the benzyl radical, and the phenyl radical. Accordingly, a more intense bluish red is obtained from the corresponding N-mono-alkyl-substituted chromogenous compound 3',6'-bis(ethylamino)spiro(phthalan - 1,9' - xanthene), while a still more intensely colored quinonoid form having a red or somewhat bluish red color may be obtained from the N-dialkyl-substituted compound 3',6'-bis(dimethylamino) spiro(phthalan-1,9'-xanthene). The 5-amino-2',2''-epoxy derivatives of 1,1-bis(p-aminophenyl)phthalan may be exemplified by the N-substituted compound 3',5,6'-tris (dimethylamino)spiro(phthalan-1,9'-xanthene), which develops a very intense reddish violet color.

The compounds given in the above examples, having the 5-membered heterocyclic ring containing the hetero oxygen atom, may be referred to as cyclic ethers. Compounds of this type, and webs carrying transfer coatings containing such compounds, are disclosed and claimed in the concurrently filed application for Letters Patent of the United States Ser. No. 135,307, entitled "Chromogenous Amino Derivatives of Diphenylphthalan and Marking Method Using Same," filed in the names of John R. Johnson and Earl J. Gosnell and assigned to the same assignee as the present invention.

Such cyclic ether compounds without the epoxy bridge may be prepared by reduction of the corresponding lactones of p-amino-substituted triphenylmethanes, namely 3,3 - bis(p-aminophenyl)phthalide, 6 - amino - 3,3 - bis(p-aminophenyl)phthalide, and the N-substituted derivatives thereof. Procedures for making these lactones are discussed in U.S. Pat. Nos. 2,417,897, 2,474,084, and 2,597,-965 to Adams and No. 2,742,283 to Crounse.

The synthesis of the cyclic ethers from such lactones may be achieved with the use of anhydrous aluminum lithium hydride; for example, about 10 grams of the $AlLiH_4$ may be refluxed with about 0.025 mole of the appropriate lactone in 350 ml. of ethyl ether for several hours. After adding water, the ether layer is decanted and dehydrated, and the ether is evaporated to obtain the solid product, usually having a white or light pastel color. If the solid chromogenous material which has been synthesized is darker than a medium pastel shade, repeated purification treatments using standard procedures, such as solvent or freeze crystallizations and selective solvent extractions, as with ether, can be expected to yield a light-colored product approaching a colorless, that is, white, solid. Such chromogenous substances can be incorporated readily on paper in transfer coatings which appear substantially white or which have a creamy color quite acceptable as an ordinary paper surface.

Synthesis of the cyclic ether compounds, with the epoxy bridge, namely the 2',2''-epoxy and 5-amino-2',2''-epoxy derivatives of 1,1 - bis(p - aminophenyl)phthalan with N-substituents as desired, also may use a lactone as a starting material. Lactones with the epoxy bridge may be formed by reaction, in the presence of $ZnCl_2$, of phthalic anhydride or 4-aminophthalic anhydride and m-aminophenol, with appropriate substituents for the amino hydrogen atoms in both of these reagents. The aminophenol conveniently may be melted and the other materials dispersed in the melt. The mixture is maintained in molten condition during the reaction period, at the conclusion of which the melt contains in major amount 3',6'-diaminofluoran having the structural formula

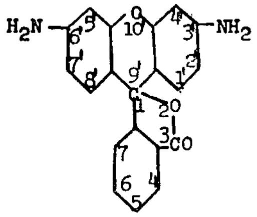

with corresponding substituents. Thus, if 4-aminophthalic anhydride is used, the lactone compound has a 5-amino group. Similarly, the aforementioned substituents for the hydrogen atoms in the amino groups of both reagents appear as N-substituents in this fluoran product, known in the art as a rhodamine lactone or colorless base. The lactone conveniently may be separated from the crude reaction mixture by digestion in dilute aqueous ammonium hydroxide to dissolve other materials and convert the lactone to solid particles of the corresponding carbinol or color base, which are filtered off, washed, and dried. Refluxing the carbinol in benzene under dehydrating conditions effects recovery of the colorless or lightly colored lactone product shown above in the structural formula for diaminofluoran.

Alternatively the lactone product may be obtained from the commercial rhodamine dye, such as Rhodamine B. The dye, incidentally, may be obtained conventionally by extracting the carbinol or color base, produced as above, with benzene and further extracting the resulting benzene solution with dilute hydrochloric acid, whereupon crystals of the purified dye separate from the aqueous acid solution on cooling. When starting with the dye, the carbinol is regenerated by treatment of an aqueous solution of the dye with sodium hydroxide, extracting, filtering, and drying, followed by the above-mentioned refluxing in benzene under dehydrating conditions to close the lactone ring and form the fluoran product.

Refluxing the substituted 3',6'-diaminofluoran, or rhodamine lactone, material thus obtained in anhydrous ether containing aluminum lithium hydride effects reduction to the desired corresponding cyclic ether compound with the epoxy bridge. This substituted 3',6'-diaminospiro(phthalan-1,9'-xanthene)compound may be termed a rhodamine cyclic ether. Such a reduction procedure is analogous to the reduction of the 3,3-bis(p-aminophenyl)phthalides to their corresponding cyclic ethers utilizing aluminum lithium hydride, as described above. While the rhodamine lactones themselves are chromogenous compounds useful in the production of colored forms in accordance with the present invention, as will be mentioned hereinbelow, the corresponding rhodamine cyclic ethers exhibit considerably greater stability against premature conversion to colored forms and are considered preferable for use in accordance with the present invention.

Turning next to the 3-oxo derivative of 1,1-bis(p-aminophenyl)phthalan, this compound is a lactone having the structural formula

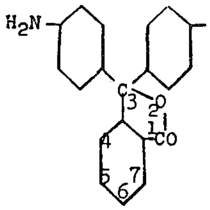

Since more conventional nomenclature treats this compound as a phthalide derivative, namely 3,3-bis(p-aminophenyl)phthalide, the usual numbering of the ring components for phthalide will be used, as shown above. With N-substituents as desired, this is the same phthalide substance already mentioned in connection with the synthesis of the cyclic ethers. The unsubstituted 3,3-bis(p-aminophenyl)phthalide develops a violet color upon intimate contact with a recommended phenolic color-activating substance. A more intense, greenish blue color can be obtained using 3,3-bis(p-methylaminophenyl)phthalide. However, formation of darker quinonoid compounds can be expected from N-tetraalkyl-substituted compounds. Thus a considerably more intense green or somewhat bluish green color is developed using 3,3-bis(p-dimethylaminophenyl)phthalide, which conveniently may be referred to as the lactone of leuco-malachite green, and an excellent dark, intense, bluish green quinonoid form also is produced from 3,3-bis(p-diethylaminophenyl)phthalide. Similarly, a blue-green color is obtained with 3,3-bis(p-dipropylaminophenyl)phthalide. Also quite satisfactory, although not N-alkyl-substituted, is 3,3-bis(p-dibenzylaminophenyl)phthalide, giving a greenish blue colored form.

The 5-amino-3-oxo derivative of 1,1-bis(p-aminophenyl)phthalan, also a lactone, is better named 6-amino-3,3-bis(p-aminophenyl)phthalide, having the structural formula

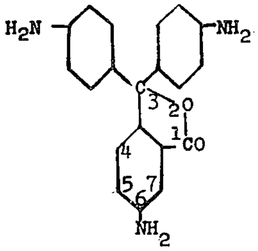

Preparation of this triamino-substituted 3,3-diphenylphthalide also is mentioned above. A violet-red or bluish red color may be developed from this compound, as shown without amino substituents. Bluish-violet colors generally are obtained in the quinonoid forms of such compounds which have two or preferably three N-alkyl substituents, such as 6-amino-3,3-bis(p-methylaminophenyl)phthalide and 6-ethylamino-3,3-bis(p-ethylaminophenyl)phthalide. However, for the property of rapid production of intense, dark, bluish violet quinonoid forms it is preferred to use N-hexaalkyl-substituted compounds. These are exemplified by 6-dimethylamino-3,3-bis(p-dimethylaminophenyl)phthalide, also identified as crystal violet lactone, and by 6-diethylamino-3,3-bis(p-diethylaminophenyl)phthalide and the same compound with three dipropylamino groups in place of the diethylamino groups. Considered particularly desirable for the production of bluish violet colored forms is 3,3-bis(p-diethylaminophenyl)-6-dimethylaminophthalide, for which there may be substituted the compound 3,3-bis(p-diisopropylaminophenyl)-6-dimethylaminophthalide. Similar properties also are obtained with n-butyl groups, as in 6-dibutylamino-3,3-bis(p - dibutylaminophenyl)phthalide. Again, benzyl and phenyl substituents may be used in place of alkyl substituents. Thus, a different color for the quinonoid form may be obtained from 6-N-benzyl-N-methylamino - 3,3-bis(p-N-benzyl-N-methylaminophenyl)phthalide having a red-violet quinonoid form, and the compound 3,3 - bis(p-anilinophenyl)-6-dimethylaminophthalide has a blue dark-colored form.

It will appear from the foregoing that the N-substituted 3,3-bis(p-aminophenyl)phthalide and 6-amino-3,3-bis(p-aminophenyl)phthalide compounds are preferred for their good chromogenous properties. Such colorless or lightly colored compounds may be defined as chromogenous compounds having a modified 3,3-diphenylphthalide structural formula

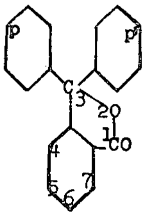

which includes the three points, designated on the above formula as the p,p′,6-positions, each para to the position of a bond to the methane carbon atom occupying the 3-position in this formula, and which is modified by the inclusion of an amino substituent in each of at least the first-mentioned two of the three p,p′,6-positions. When those two p.p′-positions have that substituent, the compound is a 3,3-bis(p-aminophenyl)phthalide, and when all three p,p′,6-positions have that substituent, the chromogenous compound is in the form of a 6-amino-3,3-bis-(p-aminophenyl)phthalide. Again, each of the amino radicals in these compounds should have at least one substituent selected individually from the group consisting of an alkyl radical of not more than four carbon atoms, the benzyl radical, and the phenyl radical.

The examples mentioned above indicate that the alkyl groups in these compounds advantageously are methyl, ethyl, n-propyl, and isopropyl groups. A particular preference is noted for the hexaalkyl-triamino-substituted 3,3-diphenylphthalide chromogenous compounds, in the form of 6 - dialkylamino - 3,3 - bis(p - dialkylaminophenyl) phthalide compounds in which each individual alkyl radical of the three dialkylamino groups has not more than three carbon atoms.

The 2′,2″-epoxy-3-oxo derivative of 1,1-bis(p-aminophenyl)phthalan is 3′,6′-diaminofluoran having the structural formula

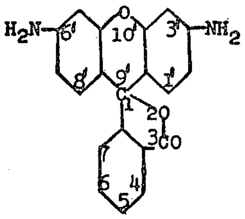

which can be used to develop a reddish color with a tinge of blue or violet. The N-substituted derivatives or rhodamine lactones are preferred, and their synthesis by known procedures is summarized hereinabove. Better color intensity of the quinonoid form is obtained from 3′,6′-bis(ethylamino)fluoran and still deeper color from 3'-diethylamino-6'-ethylaminofluoran, which is the lactone of Rhodamine 4G, while a preferred chromgenous amino-substituted fluoran is 3',6'-bis(diethylamino)fluoran, the lactone of Rhodamine B; these chromogenous compounds have bluish red quinonoid dark-colored forms. The compound 3',6'-dianilinofluoran also is useful and forms a violet dark-colored substance. Compounds which may be viewed as 5-amino-2',2''-epoxy-3-oxo derivatives of 1,1-bis(p-aminophenyl)phthalan, in other words 3',5,6'-triaminofluoran, with N-substituents, also may be obtained, as by the synthesis mentioned above using the reagents 4-aminophthalic anhydride and m-aminophenol with corresponding N-substituents; an example is the chromogenous compound 3',5,6'-tris(dimethylamino)fluoran, which can form a very intensely colored reddish violet substance. The lactone ring structure present in these aminofluoran compounds has a tendency to open with consequent premature formation of a colored material, and it has been reported that this tendency is fostered in the presence of highly polar solvents such as alcohol, acetone, and water. Accordingly, when these chromogenous compounds are used, they should be protected against contact with such materials or vapors prior to formation of the desired permanent dark-colored forms by contact with the color-activating material on the face-coated sheet in accordance with the invention; or corresponding rhodamine cyclic ethers may be used.

Coming now to the bifunctional derivatives of 1,1-bis(p-aminophenyl)phthalan having a second heterocyclic ring fused to the 5,6 side of the benzene nucleus, these derivatives will be seen to be based on the compounds having the structural formula

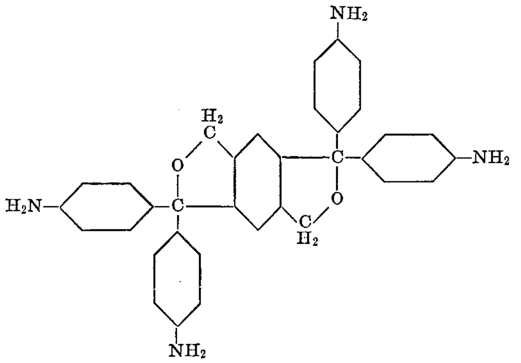

and the isomeric structural formula

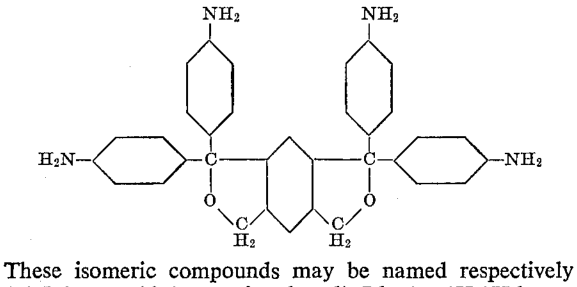

These isomeric compounds may be named respectively 1,1,5,5 - tetrakis(p - aminophenyl)-7-hydro-1H,3H-benzo(1,2-c:4,5-c')difuran and 1,1,7,7 - tetrakis(p - aminophenyl)-5-hydro-1H,3H-benzo(1,2-c:4,5-c')difuran. Each of these two compounds has two heterocyclic furan rings fused to the central benzene nucleus, and each of these furan rings includes one carbon atom carrying two unsubstituted hydrogen atoms, as may be seen at the bottom of the last structural formula shown above.

The last mentioned carbon atoms may be oxo-substituted; that is, the two hydrogen atoms carried by each carbon atom may be replaced by an oxygen atom. Each furan ring thus assumes a gamma-lactone structure, instead of the cyclic ether structure, giving a bifunctional lactone, or dilactone, compound. The respective dilactone compounds may be named 3,3,7,7 - tetrakis(p - aminophenyl) - 1H,3H - benzo(1,2-c:4,5-c')difuran - 1,5(7H)-dione and 3,3,5,5-tetrakis(p-aminophenyl)-1H,3H-benzo(1,2-c:4,5-c')-difuran-1,7(5H)-dione.

Dilactone compounds of the last-mentioned type are disclosed and claimed in the concurrently filed application for Letters Patent of the United States Ser. No. 135,264, entitled "Chromogenous Aminophenyl Derivatives of Benzodifurandione and Marking Method Using Same," filed in the names of Earl J. Gosnell and John F. McCarthy, Jr., and assigned to the same assignee as the present invention. A representative N-substituted dilactone compound may be synthesized by dissolving one mole of N,N-dimethylaniline in about four times its weight of carbon disulfide and stirring in about 0.9 mole of anhydrous aluminum chloride as a catalyst. After dissolution of the $AlCl_3$, 0.2 mole of pyromellitic dianhydride is added, stirred, and allowed to stand. The upper layer of the $CS_2$ is decanted and 1250 ml. of 8% sulfuric acid added to it slowly. After dilution with about 10 liters of water and standing, the first stage of the synthesis gives an approximately 90% yield of a solid intermediate product which is a mixture of two isomeric compounds having the structural formulas

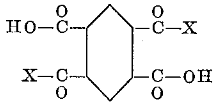

and

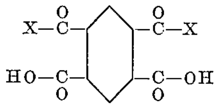

where each radical designated X is the p-dimethylaminophenyl radical derived from the N,N-dimethylaniline. In the second stage of the synthesis, a portion of the isomeric intermediate mixture then is heated at reflux temperature for 24 hours, with a further amount of N,N-dimethylaniline equal to about 4.5 to 5 times the equimolar weight, in a volume of liquid acetic anhydride weighing about 7 to 8 times as much as the weight of the N-substituted aniline. Cooling and filtering gives a solid acetic anhydride-insoluble product of light yellow color, and pouring the filtrate over crushed ice and filtering gives a solid acetic anhydride-soluble product of light greenish yellow color, both in good yields. A mixture of these two solid products may be obtained by flushing with ice water before filtering out the acetic anhydride-insoluble fraction.

These two light-colored products are the chromogenous substances selected from the group consisting of the isomeric compounds having the structural formulas

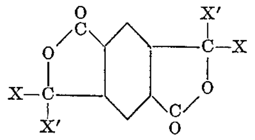

and

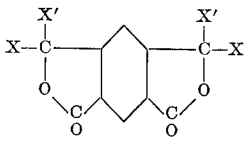

where X is as above and the radical designated X' also is the p-dimethylaminophenyl radical, derived in this instance from the dimethylaniline used in the reaction with the intermediate mixture. It will be appreciated that aniline itself, or other N-substituted anilines, may be used in forming the intermediate mixture with corresponding variations in the p-aminophenyl radical X, while aniline, or still another N-substituted aniline, may be used as the reagent with the intermediate isomers to get the dilactone product with other corresponding variations in the p-aminophenyl radical X'. Yields of the acetic anhydride-insoluble and -soluble fractions vary, and standard purification procedures such as solvent or freeze crystallizations and selective solvent extractions can be utilized where necessary to recover crystalline products having substantially colorless creamy or light pastel shades. The dilactones generally can be heated well above 300° C. without melting or decomposition.

The synthesis of a specific chromogenous dilactone compound, or isomeric mixture of such compounds, having the structure represented by the formulas given above where all of the radicals designated both X and X' are p-dimethylaminophenyl groups, is mentioned hereinabove by way of example. The two isomeric fractions have very low solubilities in most of the common organic solvents. However, they dissolve up to a few percent or more in some of the solvent vehicles such as the simple or chlorinated phenyl ethers and chlorinated polyphenyls, and the solution of either one or both of the above-mentioned fractions gives instantaneously a dark blue-green colored form when brought into contact with one of the phenolic substances listed hereinabove.

Indicating the variety of dilactone chromogenous compounds which can be utilized in accordance with the present invention, the use of unsubstituted aniline in the synthesis described above gives the tetrakis(p-aminophenyl)benzodifurandione or dilactone substance without N-substitutuents, X and X′ both being p-aminophenyl radicals, and contact with developers yields a reddish or purplish tan colored form. It is much preferred, however, to use substituted anilines, particularly N,N-disubstituted anilines. Thus the N,N-dimethylaniline advantageously is used in many cases to make the intermediate product having the p-dimethylaminophenyl group for the radical X. However, appropriate variations in the substituted aniline reacted with the intermediate product in the second stage of the synthesis described above yield dilactone products in which the radical X′ consists of different N-substituted p-aminophenyl groups, preferably other N-dialkyl-substituted groups with alkyl radicals of not over three carbon atoms. X′ accordingly may be the p-diisopropylaminophenyl radical, while X remains the p-dimethylaminophenyl radical. This dilactone substance also gives a dark blue-green quinonoid form on contact with a phenolic developer material. Blue-green forms also are obtained from the dilactone in which X′ is the p-N-benzyl-N-ethylaminophenyl group, while the dilactone in which X′ is the p-dibenzylaminophenyl group gives a bluish green to green dark-colored form. Corresponding and sometimes superior results can be obtained with halo or methyl substituents on the phenyl ring in the p-aminophenyl radical. Thus, when m-chloro-N,N-diethylaniline is used in the second stage of the synthesis, the resulting dilactone product has o-chloro-p-diethylaminophenyl groups for the X′ radicals, X still remaining the p-dimethylaminophenyl group. This substance gives a green dark-colored form. When X′ is the p-diethylamino-o-tolyl group, the quinonoid form has a strong dark green color. Thus certain compounds, with halo and methyl substituents in the ortho, and meta, positions of the p-aminophenyl groups, are equivalent to the compounds without such substituents.

A preferred dilactone substance of the type just described, having dialkylaminophenyl groups, will be seen to include a colorless or lightly colored chromogenous compound based on the structure of pyromellitic dianhydride

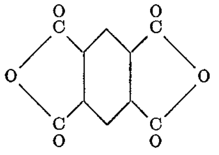

including, fused to opposite sides of the benzene nucleus, two heterocyclic rings

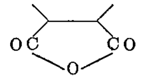

each containing a hetero oxygen atom in the ring, and to each of which two other oxygen atoms are attached. One of these two oxygen atoms attached to each heterocyclic ring thereof is replaced by two p-dialkylaminophenyl groups, in which each individual one of the four alkyl radicals has not more than three cargon atoms.

Instead of a dilactone substance, there may be used the corresponding bifunctional cyclic ethers, which are the usually N-substituted derivatives of the 1,1,5,5-tetrakis (p-aminophenyl) - 7 - hydro - 1H,3H - benzo(1,2-c:4,5-c′)difuran and of its isomer, shown above. To produce the bifunctional cyclic ethers, or dicyclic ethers, appropriate dilactones, such as those just mentioned may be added to ethyl ether which is maintained at reflux temperature and which contains aluminum lithium hydride, and the bifunctional cyclic ether recovered by filtration and solvent evaporation. These products after purification have chromogenous characteristics similar to those of the corresponding dilactone materials, having the same N-substituted p-aminophenyl groups represented by the radicals X and X′ in the structural formulas shown above.

In addition to such bifunctional cyclic ethers, and the bifunctional lactones, or dilactones, already described, the corresponding bifunctional derivatives of 1,1-bis(p-aminophenyl)phthalan having the epoxy bridges also may be used. In this category the diepoxy-substituted dilactones have the isomeric structural formulas

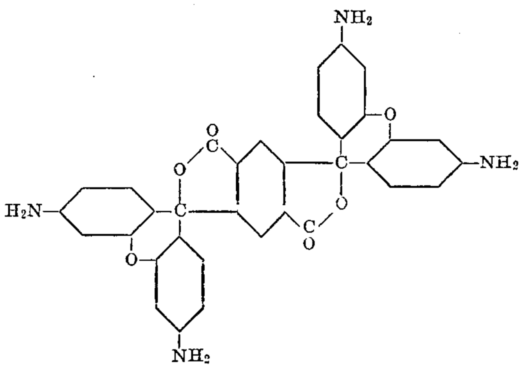

and

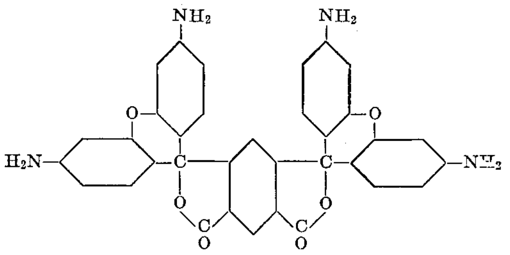

and the amino hydrogen atoms again preferably are replaced by alkyl, benzyl, or phenyl radicals. Thus all of the amino groups may be dialkylamino groups in which each alkyl radical has no more than three carbon atoms, e.g., dimethylamino groups or diethylamino groups.

As an example, the isomeric substance having diethylamino groups may be obtained by heating one mole of m-diethylaminophenol and roughly one mole of anhydrous zinc chloride with 0.2 mole of pyromellitic dianhydride

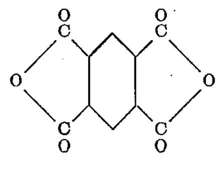

for several hours at 160° C. while stirring the melt, to form in the melt a moderate yield of a bifunctional compound including the structure

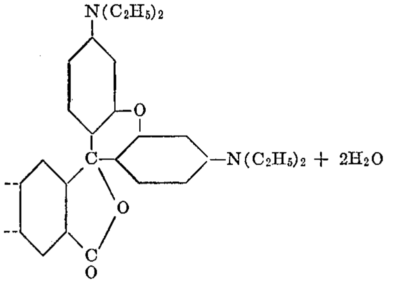

It will be seen that the portion of the molecular structure illustrated here is the lactone of Rhodamine B, that is 3',6'-bis(diethylamino)fluoran. It will be understood further that the pyromellitic dianhydride acquires a similar spiro-linked xanthene structure, not illustrated here, on the other side of the benzene nucleus, where another one of the dianhydride carbonyl oxygen atoms is replaced with two more aminophenyl radicals. Thus a third molecule of water is split off, formed from this oxygen atom and the hydrogen atoms in the 6-positions on two additional 3-diethylaminophenol molecules. A second xanthene epoxy bridge also is formed by removal of a fourth water molecule from the two adjacent phenolic hydroxyl groups in these two additional aminophenol molecules.

To recover this product from the reaction mixture, a procedure related to that indicated hereinabove in connection with production of the familiar rhodamine lactones then may be followed. Thus the melt, containing the reaction product formed from the pyromellitic dianhydride and the 3-diethylaminophenol, may be cooled, finely powdered, and digested with dilute aqueous ammonium hydroxide, leaving undissolved the bifunctional carbinol

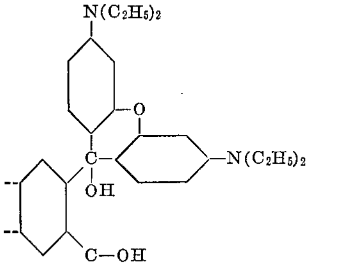

This substance is separated by filtering it out of the ammonium hydroxide solution, washing with fresh dilute ammonium hydroxide, and drying. Reclosure of the two lactone rings is accomplished by refluxing the carbinol with benzene, which conveniently is done with a standard condenser and Stark and Dean tube apparatus to remove the water split off from the carbinol hydroxyl groups and the adjacent carboxyl hydrogen atoms. The resulting benzene solution is then filtered and evaporated under vacuum to recover the bifunctional rhodamine lactone substance, whose structure is illustrated by the isomeric formulas shown above, all the amino hydrogen atoms being replaced by ethyl radicals in this example.

This product is more or less colorless, having a creamy to light pink color. By using other N-substituted m- or 3-aminophenols, a variety of other chromogenous rhodamine dilactone compounds, having different N-substituents and also only lightly colored, may be prepared, as will be understood from a consideration of the various N-substituted dilactone compounds discussed hereinabove, which are the corresponding bifunctional lactones without the epoxy bridges. The colored forms of these rhodamine dilactone substances resemble in hue the colored forms of the corresponding rhodamine lactones, giving generally bluish red colors. However, the rhodamine dilactone substances share with the monofunctional rhodamine lactone compounds a tendency toward premature opening of the lactone rings, which may cause coloration of the chromogenous material before marking contact has been effected with the desired color-activating material. Of course, the rhodamine dilactone substance may be protected from premature contact with atmospheric or other environments which permit premature coloring.

However, it may be preferable to convert the rhodamine dilactones to the corresponding bifunctional cyclic ether substances, which have considerably more stability against adventitious color formation as when exposed to a humid atmosphere. Such bifunctional cyclic ether substances include the structure

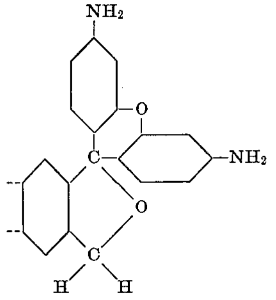

with suitable N-substituents. Each monofunctional molecular arrangement in this category of bifunctional substances will be seen to include the structure of 3',6'-diaminospiro(phthalan-1,9'-xanthene), as illustrated here. These bifunctional cyclic ether substances likewise may have either, or a mixture of both, of the isomeric forms corresponding to the two isomeric structural formulas given above for the rhodamine dilactone substances. Any two isomeric compounds of this structure give very similar colored forms, which also are similar in hue to the colored forms produced from the corresponding rhodamine dilactone and rhodamine lactone substances, although with some N-substituents minor differences in hue may be observed, even between isomeric pairs, depending on the color-activating substance used.

All of the bifunctional substances in the categories of bifunctional lactones, cyclic ethers, rhodamine lactones, and rhodamine cyclic ethers have high melting points and generally can be heated above 300° C. in a neutral atmosphere without melting or decomposing. Several nonpolar or mildly polar solvents may have to be tried in order to fine one which will dissolve several percent or more of these bifunctional chromogenous substances.

The bifunctional rhodamine cyclic ethers, having the functional arrangement illustrated above, are obtained by reduction of the corresponding chromogenous rhodamine dilactone substances, using either of the isomeric forms thereof or a mixture of such forms. The rhodamine dilactone is stirred slowly into a semidissolved mixture of aluminum lithium hydride in anhydrous ethyl ether. The resulting mixture is refluxed to permit reaction, cooled, and water is added dropwise. The ether layer is decanted, dried with a solid desiccant such as anhydrous sodium sulfate, and the ether evaporated to obtain the chromogenous, substantially colorless or light pink, solid rhodamine dicyclic ether substance.

The chromogenous bifunctional compounds comprising the dicyclic ethers reduced from dilactone substances, the rhodamine dilactone substances with the epoxy bridges, and the bifunctional rhodamine dicyclic ethers prepared therefrom as just described, are disclosed and claimed in a concurrently filed application for Letters Patent of the United States Ser. No. 135,359, entitled "Chromogenous Tetrakis(aminophenyl) Derivatives of Benzodifuran and Marking Method Using Same," filed in the name of Earl J. Gosnell and assigned to the assignee of the present invention.

All of the monofunctional and bifunctional chromogenous compounds described hereinabove have a bis(p-aminophenyl)methyl group, or a 3,6-diamino-9-xanthenyl group, with an additional linkage from the methyl carbon atom in the former, or from the carbon atom designated 9 in the latter, to the hetero oxygen atom. Some of the monofunctional compounds have a third amino radical, on the benzene nucleus one side of which is in the heterocyclic ring. In the preferred chromogenous compounds these amino radicals have substituents, for which the methyl and ethyl N-substituents are chosen frequently. Propyl and butyl substituents for one or both of the amino hydrogen atoms provide quite similar properties, so that alkyl radicals of not more than four carbon atoms are suitable. Examples of N-benzyl and N-phenyl groups also appear hereinabove.

Equivalent results also may be obtained, for example, with certain saturated monoalkyl radicals having five carbon atoms or with the mono-n-hexyl radical as N-substituents, and N-substituted cycloalkyl groups such as the cyclopropyl and cyclohexyl groups may be present, but these N-substituents are not preferred. As further examples, the N-phenyl-substituted compounds may be modified by including naphthyl radicals instead of phenyl radicals as N-substituents, or certain small additional substituents may be included on the N-substituted radicals mentioned above, and generally equivalent properties still will be obtained in this connection such N-substituted groups as the chloromethyl, hydroxyalkyl (e.g., beta-hydroxyethyl, gamma-hydroxypropyl, or delta-hydroxybutyl), sulfophenyl, tolyl, or one of the methylbenzyl radicals may be mentioned. Equivalent to the aminophenyl groups themselves in some chromogenous compounds are amino-1-naphthyl groups thus 4-diethylamino-1-naphthyl groups may replace p-diethylaminophenyl groups. Instead of N substituted amino groups, equivalent results also may be expected with piperidino groups, or an entire N-substituted p-aminophenyl group may be replaced by the 9-julolidyl radical

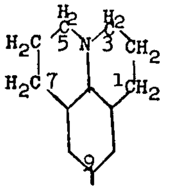

It will be appreciated likewise that substantially equivalent properties also are obtainable in the chromogenous compounds when one small substituent or several small substituents, notably one or more methyl, chloro, bromo, fluoro, or nitro radicals, is or are substituted for one or more of the available hydrogen atoms on the phenyl rings in the aminophenyl radicals or on the benzene nucleus one side of which is in the heterocyclic ring.

Reference now will be made to the chemical structure of the phenolic substances included in applicant's color-forming composition. These phenolic substances may be classified broadly as (1) biphenols, including for present purposes methylenediphenols and certain other related compounds, and (2) substituted phenols.

The biphenol compound utilized in the present invention is selected from the group consisting of:

(a) biphenol,
(b) bicresol,
(c) dibenzylbiphenol,
(d) diethylbiphenol,
(e) dipropylbiphenol,
(f) diallylbiphenol,
(g) dihalobiphenol,
(h) biphenyltetrol,
(i) terphenyldiol,
(j) methylenediphenol,
(k) alkylidenediphenol,
(l) cycloalkylidenediphenol,
(m) methylenediresorcinol,
(n) methylenebis(alkylphenol),
(o) methylenebis(benzylphenol),
(p) methylenebis(phenylphenol),
(q) methylenebis(halophenol),
(r) methylenebis(trihalophenol),
(s) methylenebis(tetrahalophenol),
(t) substituted methylenediphenol in which each phenol has only two substituents selected from the group consisting of the alkyl, benzyl, phenyl, and halo radicals but in which these two substituents and the linkage to the methylene group do not occupy all of the 2,4,6-positions relative to the phenolic hydroxyl group,
(u) thiodiphenol,
(v) sulfonyldiphenol, and
(w) magnesium salt of pentachlorophenol.

The substituted phenol compound utilized in the present invention has substituent radicals selected from the group consisting:

Of a single substituent which is one of the (a′) alkyl,
(b′) allyl,
(c′) halo,
(d′) halo-substituted alkyl,
(e′) cycloalkyl,
(f′) phenyl,
(g′) halo-substituted phenyl,
(h′) alkyl-substituted phenyl,
(i′) biphenylyl,
(j′) benzyl, and
(k′) alpha-alkylbenzyl radicals;

Of
(l′) any two substituent radicals and of
(m′) any three substituent radicals included among the single substituents (a–k), except when two of these two (l) or three (m) substituent radicals are in the 2,6-positions relative to the phenolic hydroxyl group;

Of the
(n′) tetramethyl and
(o′) tetrahalo radicals;

Of any
(p′) of these substituent radicals (a–k) and groups of
(q′) two substituent radicals (l),
(r′) three substituent radicals (m), and
(s′) four substituent radicals (n-o), but with a second hydroxyl radical also on the phenol;

Of the
(t′) para-nitro radical; and

Of the
(u′) pentamethyl and
(v′) pentahalo radicals.

Obviously there is available a large variety of substituted phenols which have one of the substituents or groups of substituents listed in the above tabulation. In addition to the large selection of the type of substituent or substituents, their positions on the benzene ring relative to the phenolic hydroxyl group also may be varied, often affecting to some degree the speed or ease of production, and the brilliance or even the hue, of the dark-colored marks obtained when contact is effected with a given chromogenous compound.

There are mentioned hereinbelow examples of all of the phenolic compounds identified in the above tabulation. These examples illustrate the variety of compounds available, including those which differ from each other primarily by the positions of the phenolic hydroxyl groups and of other substituents on the benzene rings. These variations of substituents and their positions often affect to some degree the speed or ease of production, and the brilliance or even the hue, of the dark-colored marks obtained when contact is effected with a given chromogenous compound.

The first type of phenolic compound to be considered will be the biphenols themselves, shown below under a heading having the same designating letter used in the above tabulation.

(a) BIPHENOL

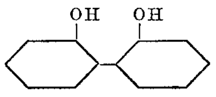

o,o'-biphenol

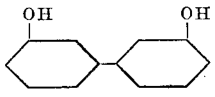

m,m'-biphenyl

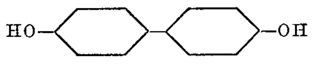

p,p'-biphenyl

All of the six biphenol isomers are useful as color-developing materials, but only the more commonly available symmetrical biphenols are shown. The o,o'-biphenol has very good color-developing capability with the chromogenous compounds, while the other two are moderately active. When a p-aminophenyl-substituted phthalide color-forming composition is dissolved in benzyl butyl phthalate, for example, and applied to a surface carrying the p,p'-biphenol, it is helpful to heat the surface mildly to hasten the formation of a dark-colored material giving intensely colored marks. Other solvent liquids suitable as carriers for one of the color reagents, usually for the chromogenous compound, are suggested herein. In the case of the phthalide compound used with the biphenol color developer just mentioned, and also with many of the other color-developing materials and chromogenous compounds mentioned below, significant variations in the speed of reaction and color intensity of the dark products formed often may be obtained by choosing different solvent or carrier liquids.

Among the biphenols having on each benzene ring a methyl, ethyl, propyl, allyl, benzyl, or halo substituent may be mentioned the following, symmetrical compounds likewise being illustrated:

(b) BICRESOL

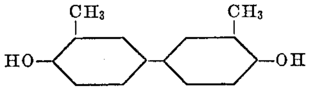

4,4'-bi-o-cresol

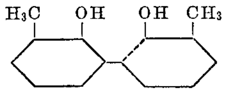

6,6'-bi-o-cresol

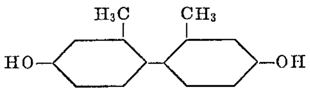

4,4'-bi-m-cresol (c) DIBENZYLBIPHENOL

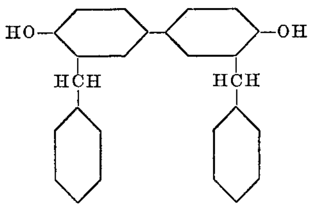

α,α'-diphenyl-4,4'-bi-o-cresol (d) DIETHYLBIPHENOL

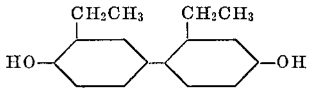

2,2'-diethyl-p,p'-biphenol

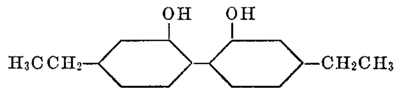

5,5'-diethyl-o,o'-biphenol (e) DIPROPYLBIPHENOL

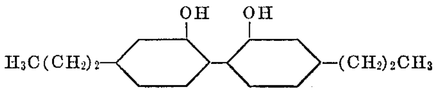

5,5'-dipropyl-o,o'-biphenol

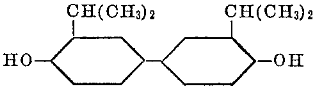

2,2'-diisoproypl-p,p'-biphenol (f) DIALLYLBIPHENOL

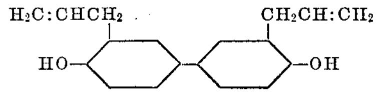

2,2'-diallyl-p,p'-biphenol (g) DIHALOBIPHENOL

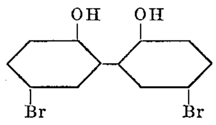

4,4'-dibromo-o,o'-biphenol

The bicresols, or dimethylbiphenols, provide moderate to good color-developing properties. As regards the dibenzylbiphenol, the positions of the phenolic hydroxyl groups and the benzyl radicals may be varied, of course, to obtain other useful compounds, corresponding for example to the bicresols shown above with various positions of the substituents. It will be appreciated, also that the allyl radicals in a diallylbiphenol compound may be replaced by other groups, such as the 1-methylallyl, 2-methylallyl, and 2-chloroallyl groups, to obtain generally equivalent properties. While a dibromobiphenol is shown as illustrating the dihalobiphenols, it will appear that other halo radicals such as the chloro radical may replace the bromo radical, and that, again, the positions of the substituents on the biphenyl structure may be varied, as with the bicresols.

The biphenol may have more than one phenolic hydroxyl radical on each benzene ring. Moreover, if the two phenolic rings are separated in the molecular structure, a phenylene group may be interposed between them. Such compounds are illustrated by the following:

(h) BIPHENYLTETROL

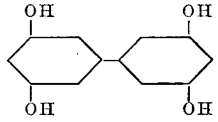

3,3',5,5'-biphenyltetrol (i) TERPHENYLDIOL

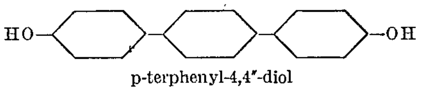

p-terphenyl-4,4''-diol

These two compounds, especially the 3,3',5,5'-biphenyltetrol, exhibit good color-developing activity.

In addition to the compounds of the biphenol type, it has been found that many compounds containing the two phenolic groups linked by a methylene radical provide high color-developing potential. A substituted methylene radical in the form of an alkylidene radical may replace the methylene radical; in this usage the term alkylidene may be taken to exclude methylene but to include ethylidene, propylidene, etc. Alternatively, the compound may include a substituted methylene radical in the form of a cycloalkylidene radical. Illustrative of such compounds are the following:

(j) METHYLENEDIPHENOL

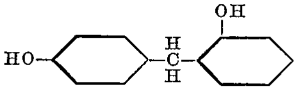

2,4'-methylenediphenol

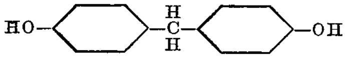

4,4'-methylenediphenol

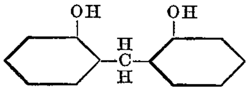

2,2'-methylenediphenol (k) ALKYLIDENEDIPHENOL

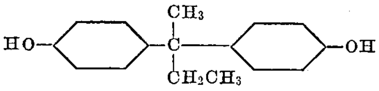

4,4'-sec-butylidenediphenol

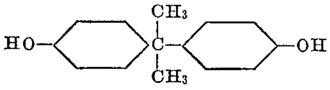

4,4'-isopropylidenediphenol (l) CYCLOALKYLIDENEDIPHENOL

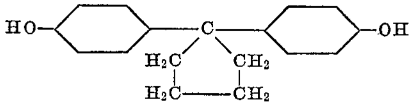

4,4'-cyclopentylidenediphenol

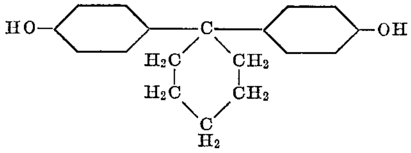

4,4'-cyclohexylidenediphenol (m) METHYLENEDIRESORCINOL

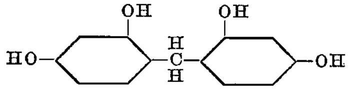

4,4'-methylene-resorcinol

Among these compounds special reference may be made to the sec-butylidenediphenol compounds, particularly 4,4'-sec-butylidenediphenol, which has been found to be particularly advantageous for use as a color-developing substance.

Particularly good results also have been obtained with a number of substituted methylenediphenols in which each phenyl ring carries an alkyl, benzyl, phenyl, or halo substituent in addition to the phenolic hydroxyl group. These compounds are exemplified by the following:

(n) METHYLENEBIS(ALKYLPHENOL)

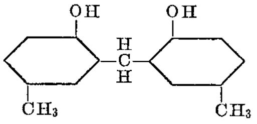

2,2'-methylenedi-p-cresol

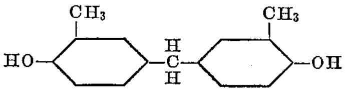

4,4'-methylenedi-o-cresol

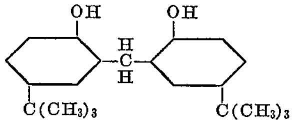

2,2'-methylenebis(4-tert-butylphenol)

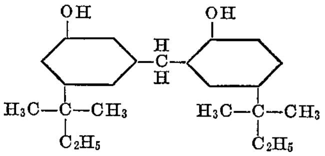

2,2'-methylenebis(4-tert-pentylphenol)

(o) METHYLENEBIS(BENZYLPHENOL)

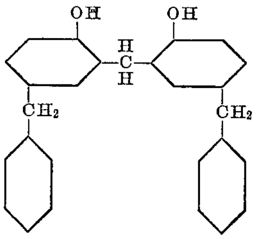

2,2'-methylenebis(α-phenyl-p-cresol)

(p) METHYLENEBIS(PHENYLPHENOL)

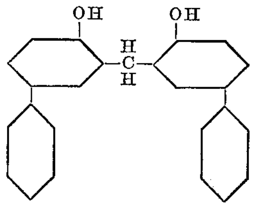

2,2'-methylenebis(4-phenylphenol)

(q) METHLYENEBIS(HALOPHENOL)

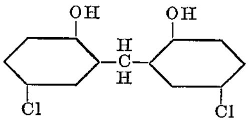

2,2'-methylenebis (4-chlorophenol)

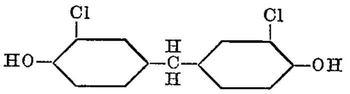

4,4'-methylenebis (2-chlorophenol)

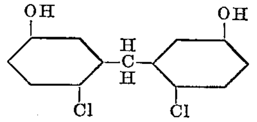

3,3'-methylenebis (4-chlorophenol)

Preferred among the compounds just shown are those with the structure of a substituted 2,2'-methylenediphenol having a substituent, in each of the two para or 4,4'-positions, selected from the group consisting of the methyl and other alkyl, benzyl, phenyl, and halo radicals. Notable among these compounds are 2,2'-methylenebis(4-phenylphenol) and 2,2' - methylenebis(4 - chlorophenol). As to the methylenebis(halophenols) illustrated, a bromo or another halo radical may be substituted for the chloro radical.

Some of these compounds are found in commercially available resinous products, which thus may be used as color-developing materials to the extent that they contain a methylenediphenol compound of the type described herein.

Certain methylenediphenol compounds having two or more substituents on each phenyl ring in addition to the hydroxyl group also are useful in the arrangements and methods of the invention, as illustrated by the following:

(r) METHYLENEBIS(TRIHALOPHENOL)

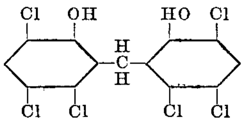

2,2'-methylenebis(3,4,6-trichlorophenol)

(s) METHYLENEBIS(TETRAHALOPHENOL)

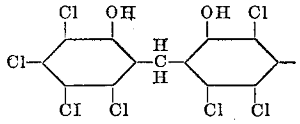

2,2'-methylenebis(3,4,5,6-tetrachlorophenol)

(t) METHYLENEBIS(DISUBSTITUTED-PHENOL)

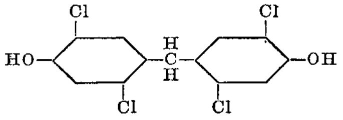

4,4'-methylenebis(2,5-dichlorophenol)

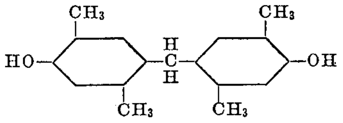

4,4'-methylenebis-2,5-xylenol

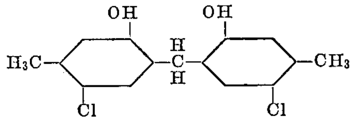

6,6'-methylenebis(4-chloro-m-cresol)

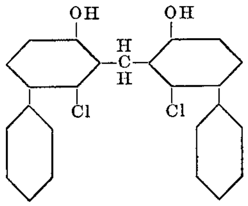

2,2'-methylenebis(3-chloro-4-phenylphenol)

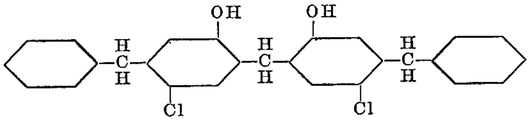

6,6'methylenebis(4-chloro-a-phenyl-m-cresol)

Certain methylenebis(disubstituted-phenol) compounds have been found to have relatively low actviity as color developers. While weak color responses have been noted with some of these componds, their use in general is not recommended. Accordingly it is preferred to use such substituted methylenediphenols, in which each phenol has only two substituents, wherein these two substituents and the linkage to the methylene group do not occupy all of the 2,4,6-positions relative to the phenolic hydroxyl group. The aforementioned two substituents may be selected from the group consisting of the alkyl, benzyl, phenyl, and halo radicals, as illustrated above. The compounds given above are illustrative only; other methylenedixylenols, for example, may be used.

Good results also have been obtained with thiodiphenol and sulfonyldiphenol, as illustrated by the following examples:

(u) THIODIPHENOL

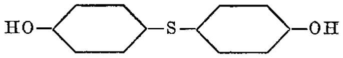

4,4-thiodiphenol

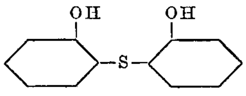

2,2'-thiodiphenol

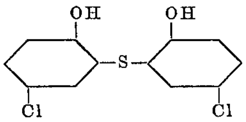

2,2'-thiobis(4-chlorophenol)

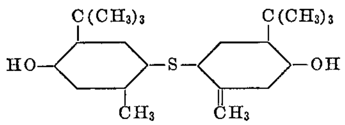

4,4'-thiobis(6-tert-butyl-m-cresol)

(v) SULFONYLDIPHENOL

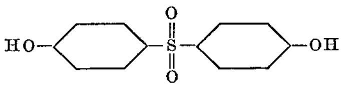

4,4'-sulfonyldiphenol

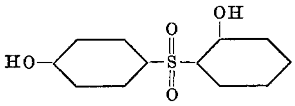

2,4'-sulfonyldiphenol (w) MAGNESIUM SALTS OF PENTACHLOROPHENOL

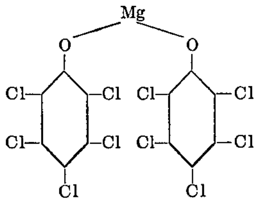

Among the compounds just mentioned, the thiodiphenols, and particularly the compound 4,4'-thiodiphenol, have high color-developing activity. Chloro-substituted and alkyl-substituted thiodiphenols, such as those also shown above, give generally equivalent results. Magnesium salts of pentachlorophenol gives great intensity of color with excellent permanence.

For the most part the phenolic color-developing compounds of the types disclosed above do not exhibit substantial solubility in water. If use in a particular system should make water solubility desirable, the sodium, ammonium, or potassium derivatives of many of the phenolic compounds disclosed above may be utilized. These derivatives, which may be designated phenoxides or phenates, in general have substantial water solubility while retaining in large measure the color-developing preperties of the corresponding phenolic compounds, and thus have been found to be essentially equivalent thereto in the system of the present invention.

Ordinarily, however, the insolubility of the phenolic compounds themselves in water is found to be advantageous. They are considered to be superior for most of the intended purposes to other phenolic color-developing substances in further respects as well, such as their high stability against oxidation, low volatility, good pigment characteristics for use in coatings, and lower tendency to cause odor or physiological sensitivity.

Among the mono-substituted phenls may be mentioned the following:

(a') ALKYPHENOL

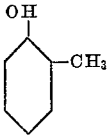
o-cresol

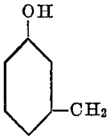
m-cresol

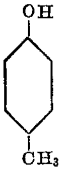
p-cresol

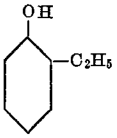
o-ethylphenol

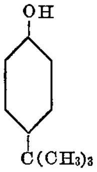
p-tert-butylphenol

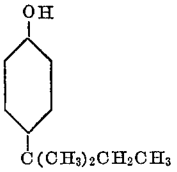
p-tert-phentylphenol

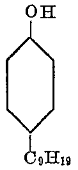
p-nonylphenol

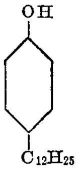
p-dodecylphenol

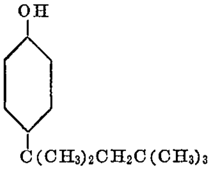
p-(1,1,3,3-tetramethylbutyl)phenol(p-octylphenol)

(b') ALLYLPHENOL

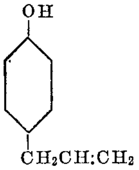
chavicol (c') HALOPHENOL

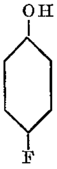
p-fluorophenol

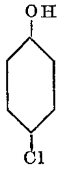
p-chlorophenol

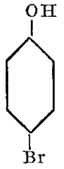
p-bromophenol

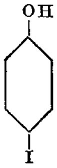
p-iodophenol

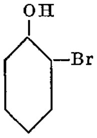
o-bromophenol

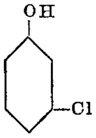
m-chlorophenol (d') HALOALKYL)PHENOL

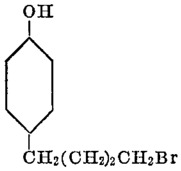
p-(4-bromobutyl)phenol (e') CYCLOALKYLPHENOL

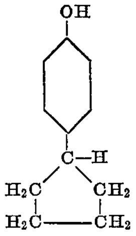
p-cyclopentyl-phenol

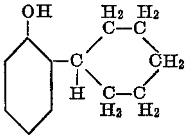
o-cyclohexylphenol

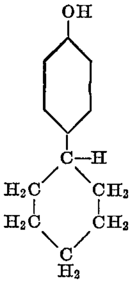
p-cyclohexylphenyl (f') PHENYLPHENOL

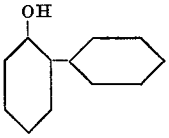
o-phenylphenol

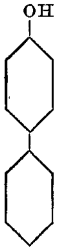
p-phenylphenol (g') (HALOPHENYL)PHENOL

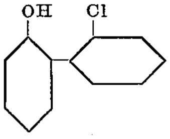
o-(o-chlorophenyl) phenol

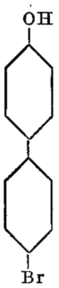
p-(p-bromophenyl)phenol (h') (ALKYLPHENYL)PHENOL

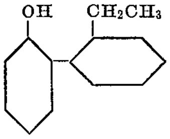
o-(o-ethylphenyl)phenol (i') BIPHENYLYLPHENOL

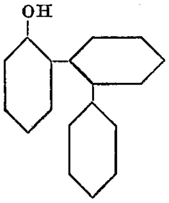
o-(2-biphenylyl)phenol (j') BENZYLPHENOL

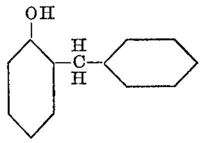

α-phenyl-o-cresol

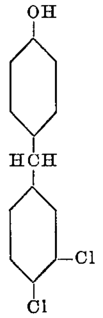

α-(3,4-dichlorophenyl)-p-cresol

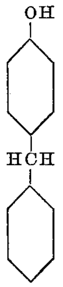

α-phenyl-p-cresol (k') α-ALKYLBENZYLPHENOL

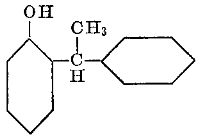

o-α-methylbenzylphenol

The above-mentioned monoalkyl-substituted phenols, and also the monohalo phenols, are among the most highly active materials for developing the color of the chromogenous compounds utilized in accordance with the present invention. The p-tert-butylphenol and p-tert-pentylphenol, although excellent color developers, are somewhat less active than the others listed. Each of the phenols shown as having the nonyl and dodecyl groups represents a compound of the commonly available commercial grade, being a mixture of isomeric monoalkyl phenols, predominantly para-substituted; they are liquids at room temperature. However, the octyl-phenol, or more specifically the p-(tetramethylbutyl)phenol having a branched alkyl chain with a total of eight carbon atoms, is a solid. The three cresols are suitable when of practical grade, not of high purity, and such o- and p-cresols as well as m-cresol are liquids at ordinary room temperature. A good dark color is developed quickly by contact of these liquid phenolic developers with the color reagent in solid form or in liquid solution. If it should be desired to use a system in which the developer compound is retained on a copy sheet, possibly for long periods of storage prior to use in marking or duplicating, there may be a problem with some compounds, such as the cresols and also the xylenols mentioned below, which tend to be volatile and to evaporate or sublime, whether they are in liquid or solid form and in some cases even though they remain solid at temperatures substantially above any ordinary room temperatures. Coating or encapsulation and adhesion techniques known to the art may be used to retain these compounds on a base web with negligible loss by evaporation under normal conditions. However, the use of alkyl substituents which give solid phenols of lower volatility may be desirable. In the case of the liquid dodecylphenol, for example, it may be dissolved in another liquid for use as a marking fluid or as part of an emulsion-type coating, or it may be emulsified without dilution in a film-forming composition used in forming a transfer coating.

Referring to the allylphenols, it will be appreciated that compounds having equivalent color-developing properties are obtained when the allyl radical is replaced, for example, by a 2-chloroallyl or 2-bromoallyl radical, or by a butenyl radical or the 1-methylallyl or 2-methylallyl radical.

The (mono-cycloalkyl)phenols shown are among the less active color developers, although they are operative to develop colored marks, and o-cyclohexylphenol, for example, can be quite useful with many chromogenous compounds.

In this connection, o-phenylphenol has been found to have moderate to good color-developing abilities, while p-phenylphenol is relatively quite poor, developing marks only slowly, or marks which are quite low in intensity, with many chromogenous compounds. When using a material having a color-developing activity as low as that of p-phenylphenol, it may be necessary to use diligently the ordinary skill of one well practiced in the art in choosing a suitable solvent for some of the chromogenous compounds, and otherwise in arranging the conditions under which the color-forming compounds are brought into contact with the phenolic developer compounds, in order to obtain markings which are not very faint. On the other hand, 2-chloro-4-phenylphenol, mentioned hereinbelow, gives colored marks considerably darker than the average marks obtained with a randomly selected phenolic developer substance of the types under consideration, and this ortho-substituted p-phenylphenol may be made to produce very dark marks immediately when brought into contact with, for example, some of the diphenylphthalide chromogenous substances.

The inclusion of small groups such as methyl or halo groups on the ring of a phenyl or benzyl substituent ordinarily gives a compound having essentially equivalent color-developing utility. In addition to the halophenyl and alkylphenyl substituents illustrated, α-(2,4-dichlorophenyl)-p-cresol is included as equivalent to the α-phenyl-p-cresol.

The phenolic compounds shown above exemplify with considerable variety the substituted phenols having substituent radicals consisting of a single substituent which is one of the alkyl, allyl, halo, halo-substituted alkyl, cycloalkyl, phenyl, halo-substituted phenyl, alkyl-substituted phenyl, biphenylyl, benzyl, and alpha-alkylbenzyl radicals.

Among the poly-substituted phenols may be mentioned the following phenols with two and three substituents:

(l') PHENOL WITH TWO SUBSTITUENTS

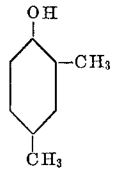

2,4-xylenol

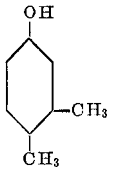

3,4-xylenol

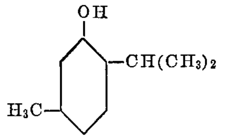

thymol

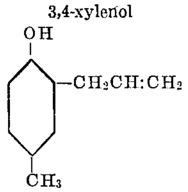

2-allyl-p-cresol

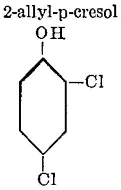

2,4-dichlorophenol

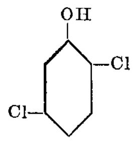

2,5-dichlorophenol

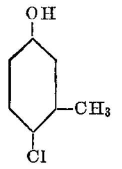

4-chloro-m-cresol

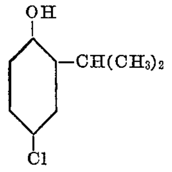

4-chloro-2-isopropylphenol

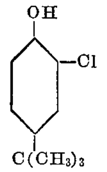

4-tert-butyl-2-chlorophenol

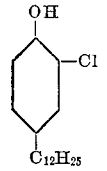

2-chloro-4-dodecylphenol

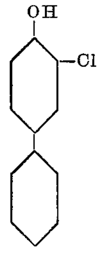

2-chloro-4-phenylphenol

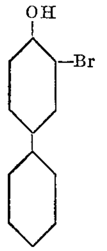

2-bromo-4-phenylphenol

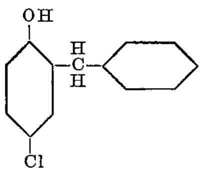

4-chloro-α-phenyl-o-cresol

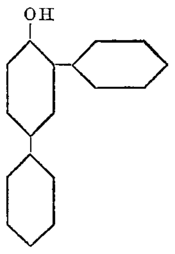

2,4-diphenylphenol (m') PHENOL WITH THREE SUBSTITUENTS

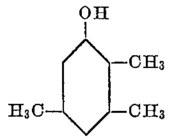

2,3,5-trimethylphenol (isopseudocumenol)

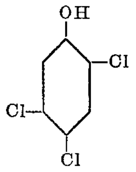

2,4,5-trichlorophenol

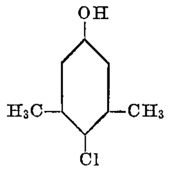

4-chloro-3,5-xylenol

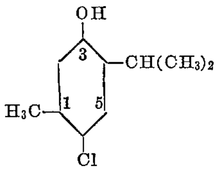

6-chlorothymol

Again a considerable range of effectiveness is observed. For example, the disubstituted compounds shown above which include chloro substituents tend to be developers of good to excellent strength, as does the 2-allyl-p-cresol. Thus, the two dichlorophenols give good results, as does 4-chloro-m-cresol. Particularly recommended are the compounds 2 - chloro-4-phenylphenol and 4-chloro-α-phenyl-o-cresol, which provide strong color-developing action with high stability and low volatility. It is notable that thymol is one of the least active of the developers shown, while on the contrary the trisubstituted compound 6-chlorothymol has particular efficacy as a developer. As with 2,4-dichlorophenol, the 2,4,5-trichlorophenol is a developer of very high activity, which is typical of the chloro-substituted phenols, whether monosubstituted or polysubstituted. The other two trisubstituted phenols shown provide relatively low effectiveness as developers, although they can produce dark-colored forms of acceptable intensity, especially with the more active chromogenous compounds having intensely dark-colored forms.

The disubstituted and trisubstituted phenolic compounds shown above provide varied examples of the substituted phenols having any two substituent radicals and any three substituent radicals included among the single substituents, listed hereinabove in connection with the monosubstituted phenols illustrated, except when two of the two or three substituent radicals are in the 2,6-positions relative to the phenolic hydroxyl group. It has been discovered that the color-developing activity of the substituted phenols thus excepted is so feeble or undependable that their use is not recommended. Examples of the latter compounds are 2,6-dichlorophenol

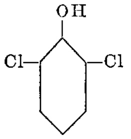

which rapidly develops color in contact with p-amino-substituted 3,3 - diphenylphthalide chromogenous compounds only to have the color disappear almost immediately; 2,4,6-trichlorophenol

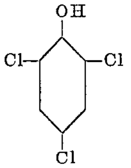

which is only weakly active; and 6-chloro-o-cresol

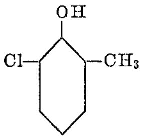

and 4-cyclohexyl-2,6-dichlorophenol

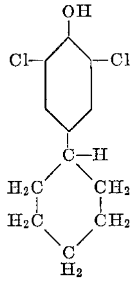

neither of which exhibits substantial color-developing ability.

Also of particular interest are certain other substituted phenols, poly-substituted with one or two exceptions, including those mentioned below:

(n') TETRAMETHYLPHENOL

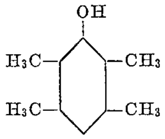

2,3,5,6-tetramethylphenol
(durenol)

(o') TETRAHALOPHENOL

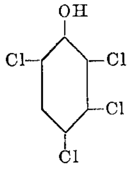

2,3,4,6-tetrachlorophenol

These substituted phenols with tetramethyl and tetrahalo radicals in general exhibit moderate color-developing activity.

In another category of substituted phenols, the subsituent radicals—specifically, the radicals in the substituted phenols which have the above-listed single substituents and which have the various groups of two and three substituents, as previously discussed, as well as the tetra-substituted radicals just mentioned—are present in compounds having also a second hydroxyl radical on the benzene ring of the phenol. Such dihydric phenols with a single other substituent on the benzene ring and with such groups of two, three, and four other substituents thereon are exemplified by the following:

(p') DIHYDRIC PHENOL WITH ONE SUBSTITUENT

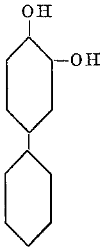

4-phenylpyrocatechol

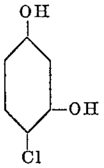

4-chlororesorcinol

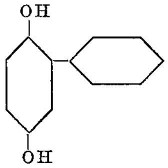

phenylhydroquinone (q') DIHYDRIC PHENOL WITH TWO SUBSTITUENTS

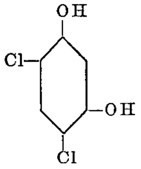

4,6-dichlororesorcinol (r') DIHYDRIC PHENOL WITH THREE SUBSTITUENTS

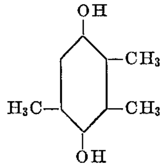

trimethylhydroquinone (s') DIHYDRIC PHENOL WITH FOUR SUBSTITUENTS

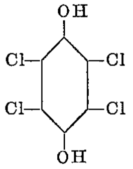

tetrachlorohydroquinone

Of the dihydric compounds shown, the phenylhydroquinone and the 4-chlororesorcinol and 4,6-dichlororesorcinol exhibit color-developing activity well above the average, while that of the others is somewhat less than the average.

The substituted phenols having as substituent radicals the para-nitro radical, developing fair to good colors in properly designed systems, and the pentamethyl and pentahalo radicals include primarily the following:

(t') NITROPHENOL

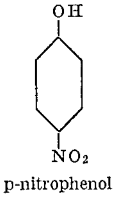

p-nitrophenol (u') PENTAMETHYLPHENOL

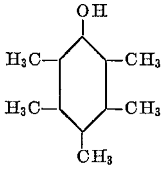

pentamethylphenol (v') PENTAHALOPHENOL

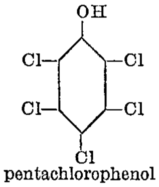

pentachlorophenol

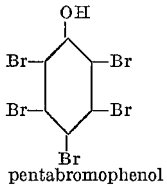

pentabromophenol

The pentasubstituted phenols also have fair to good color-developing properties, while pentachlorophenol in particular has proved quite useful as a color developer of high activity with many chromogenous compounds.

Notice has been taken hereinabove of the desirability, for the various embodiments of the present invention, of the monohalophenols, of a number of dichlorophenols and trichlorophenols, wherein bromo or other halo radicals might replace the chloro substituents, and of the tetrahalophenols, pentabromophenol, and the pentachlorophenol just mentioned. These compounds are representative of the category of substituted phenols having at least one halo substituent; as noted above with respect to the disubstituted and trisubstituted phenols in general, there should be excepted from this category such substituted phenols having two halo substituents and such substituted phenols having three halo substituents when two of the two or three substituents are in the 2,6-positions relative to the phenolic hydroxyl group.

Reference should be made, moreover, to the sodium and potassium derivatives of the substituted phenols discussed hereinabove, that is, to the corresponding phenoxides, sometimes referred to as phenates. As regards the compositions, arrangements, and methods of the present invention, these phenoxides are in general the equivalents of the substituted phenols from which they may be derived. There is a tendency for the phenoxide derivatives to exhibit slightly lower color-activating potential than the corresponding phenols. However, such phenoxides corresponding to a great many of the substituted phenols described hereinabove are well suited for applications in accordance with the present invention. Merely as illustrative examples, there may be mentioned the following, which provide good to excellent color-developing properties:

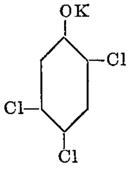

potassium 2,4,5-trichlorophenoxide

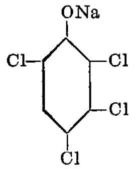

sodium 2,3,4,6-tetrachlorophenoxide

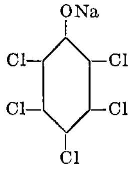

sodium pentachlorophenoxide.

An advantage of the color-activating phenolic substances utilized in accordance with the present invention is that, if desired, each of them can be dissolved readily in certain organic liquids recognized as solvents therefor. Thus the phenolic substance may be dissolved in the liquid cells in the transfer coating on the first web, and the chromogenous compound may be bonded to the contiguous surface of the second web. Of course, if the phenolic substance is a liquid at ordinary ambient temperatures, it may be emulsified directly in the aqueous film-forming solution used in forming the transfer coating, so that the phenolic substance serves in a sense as its own liquid solvent. However, it usually is preferred to adopt the reverse system, described more particularly hereinabove, and dissolve the chromogenous compound in the liquid dispersed in minute cells in the back coating 12 on the web 11, while bonding the color-activating substance to the web 13 in the adherent face coating 14.

In either case, upon local impact and rupture of the transfer coating, the release of the liquid vehicle containing one coating constituent from some of the liquid cells onto the contiguous adherent coating carrying the other coating constituent effects contact between the two coating constituents to produce a dark-colored material by the action of the phenolic substance on the chromogenous compound. The mechanism of this action need not be demonstrated in showing the operation of the arrangements and methods of the present invention. Nevertheless, it commonly is theorized, in the study of colored substances having an aminotriphenylmethane structure, that absorption or reflection of light selectively in various portions of the visible spectrum is associated with the presence of the quinonoid structure in one of the p-aminophenyl groups, as may be represented in the structural formula

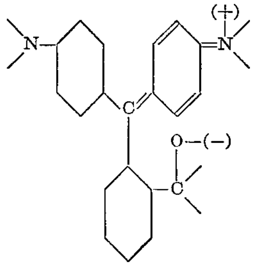

having a double bond from the methane carbon atom to a quinonoid-modified aminophenyl group, and that this quinonoid structure shifts through resonance from one to another of the aminophenyl groups. This structural formula will be recognized as being related to the molecular structure of the major functional arrangement in the chromogenous compound described hereinabove. Presumably contact of the color-activating material with the chromogenous compound results in loss of an electron from the latter, promoting the quinonoid structure having a double bond from an aminophenyl group to the methane carbon atom, with opening of the bond from the methane carbon atom to the heterocyclic oxygen atom in the chromogenous compound. The precise or complete structure of the dark-colored material, produced by the action of a phenolic color-activating material on these chromogenous compounds, is not known, and the hypothetical formula for the quinonoid form, given above, is not intended to be a complete structural representation. Whatever the exact mechanism may be, it seems reasonable in view of the present state of the art to assume that the color-activating substance acts by effectively opening a bond from the methane carbon atom with establishment of the double bond arrangement associated with an adjacent quinonoid group, permitting quinonoid resonance in the chromogenous compound.

It should be noted that the choice of one of the phenolic materials disclosed herein as the color-activating material to be used with a particular chromogenous substance, or the choice of the chromogenous substance to be used together with a particular phenolic material, may require the exercise of the good judgment of one experienced in the art, and in some instances a little experimentation, to arrive at an effective or reasonably satisfactory combination of materials for a specific system. Certain combinations of such phenolic substances and chromogenous substances naturally give the best results in terms of rapid development of very dark and intense colored forms upon ordinary contact of the two substances. The same chromogenous substance can produce dark-colored forms having noticeably different color responses or hues when brought into contact with different ones of the phenolic materials useful as color-activating substances, and the color intensity of the colored forms produced in a given system or arrangement can show gross variations when different phenolic materials are used. The colors given hereinabove for the dark-colored or quinonoid forms of certain chromogenous substances are examples of the colors ordinarily obtained when quite active color-developing phenolic compounds are used. While the phenolic materials useful in accordance with the present invention produce dark-colored forms of useful intensities after being brought into ordinary contact with many chromogenous materials, the use of some of the phenolic substances identified hereinabove which exhibit somewhat lower reactivity as color developers than the best of these color-activating substances, or the use of a less reactive chromogenous compounds, may require the application of heat, or utilization of other means of obtaining more intimate contact of the materials, to cause reasonably good color development. This might be accomplished, for example, by concentrated infrared irradiation or by conductive contact with a hot surface. For each combination of chromogenous and color-activating materials which is to be used, it has been found highly desirable to try a number of solvent liquids for the chromogenous compound, or for the color-developer when it is to be dissolved, to obtain the concentration and other environmental conditions which favor the efficient formation of a dark-colored material with desirable color intensity and hue.

As already discussed, the chemical structure of the dark-colored forms produced from these chromogenous compounds by the action of the phenolic substances has not been established, and accurate analytical methods for providing dependable and incontrovertible evidence of their chemical structure apparently are not available. It is presumed, however, that the phenol or some substantial residue thereof remains bonded or associated with the colored form to which the chromogenous compound is converted, since the colored materials differ, in improved resistance to moisture and in other characteristics, from the colored materials produced with inorganic color-developing materials and with the acids proposed for that purpose. Accordingly there is provided a new composition of matter, comprising the dark-colored substance obtained by intimate contact of the selected phenolic substance with one of the colorless or lightly colored chromogenous compounds. These new compositions formed by the action of the phenolic substances on the chromogenous compounds may be classified as novel dyestuffs which in most cases are spirit-soluble and oil-soluble.

When these dark-colored materials are formed, the method is being carried out, embodying an aspect of the present invention, in which dark-colored materials are developed from chromogenous compounds by bringing a colorless or lightly colored chromogenous compound, which includes as its major functional arrangement the molecular structure

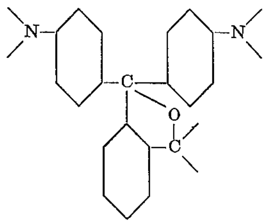

into reaction contact with a substance selected from the group of phenolic substances listed above. It will appear from the above that marking or printing may be accomplished, without the use of conventional inks containing dark pigments or colored dyes, by using instead of such inks an oily ink vehicle in which the chromogenous compound is dissolved. For letterpress printing, by way of example, the resulting, substantially colorless oily vehicle is applied to the type, which then is impressed on a web surface having a coating containing the phenolic substance to develop dark characters on the web. Alternatively, sheets having such a face coating may be used in a typewriter, which is supplied with a ribbon impregnated with an oily ribbon-inking vehicle containing one of the chromogenous substances in solution. Neither the ribbon so impregnated nor the face-coated sheets will soil the fingers or clothing. It will be understood that the chromogenous material may be brought into contact with the phenolic developer in many other ways, some being suggested hereinabove, whether or not the chromogenous material itself actually is transported to effect the contact. The phenolic compound may be carried to the chromogenous compound, or both compounds may be brought into a new location to effect mutual contact there. To give another illustration, the chromogenous material may be cemented in solid form on a paper web, using for example a starch binder, and the necessary contact then may be effected through the application of small quantities of the phenolic compound, dissolved in a solvent or at a temperature at which the phenolic compound in either pure or impure condition is in the liquid state, to the surface coating in the form of liquid droplets applied where dark-colored marks are desired. Both the phenolic compound in such liquid form and the chromogenous compound dissolved in a solvent alternatively may be applied sequentially to a surface to form marks thereon, or the two liquids may be contained in individual rupturable capsules on the same surface. Of course, the marking method may be carried out by the use of the manifolded sets described hereinabove. Any of the 1,1-bis-(p-aminophenyl)phthalan derivatives may be used as the chromogenous compound, the oxo-substituted 3,3-bis(p-aminophenyl)phthalides and 6-amino-3,3-bis(p-aminophenyl)phthalides having N-substituents often being preferred; although an N-substituted 1,1-bis(p-aminophenyl)phthalan or 5-amino-1,1-bis(p-aminophenyl)phthalan, or an N-substituted 3′,6′-diamino-spiro(phthalan-1,9′-xanthene), or one of the dilactone substances with p-dialkyl-aminophenyl groups, also usually is particularly suitable for the purpose. Some of the most active of the phenolic substances, preferred for use in the marking method of the invention, and for forming the novel dark-colored compositions of the invention by that or other methods, have been pointed out more particularly hereinabove.

Use of the phenolic color-developing substances provided in accordance with the present invention in modified spirit-duplicating systems is attractive. Two colorless or lightly colored substances are provided in such duplicating methods embodying the invention, one of these two substances being a chromogenous compound as specified herein, and the other of the two substances being one of the phenolic substances. Deposits are formed, on the surface of a master sheet, of a preselected one of these two substances in areas representing an image to be duplicated but with mirror-reversed image elements. These deposits should contain the preselected chromogenous or phenolic material in a binder which is insoluble in the duplicating fluid or spirit to be used, the fluid thus being a solvent for the aforesaid preselected material which is to be transferred but not for its binder.

There is more than one way to use the spirit transfer principle to obtain many duplicate copies from this master sheet. In one variation of this duplicating method, a solution of the remaining one of the two substances in a solvent liquid is applied to the surface of each duplicate sheet in sequence. The duplicate sheet surface, wetted with the solvent liquid containing the remaining one of the two substances, is pressed against the master sheet surface to effect transfer by the solvent liquid of portions of the deposits of the preselected one of the two substances from the master sheet surface to the duplicate sheet surface onto the areas of the latter which represent the image. By this procedure a duplicate image is formed, on the duplicate sheet surface, of dark-colored material produced by the action of the phenolic substance on the chromogenous compound.

This method may be carried out by forming a reversed image of deposits of the phenolic substance on the master sheet, and then wetting the duplicate sheets with a solvent liquid containing the chromogenous compound. However, it is preferred to use the chromogenous material for making the image-representing deposits on the master sheet. The reverse image conveniently can be formed using transfer sheets or ribbons carrying the chromogenous compound. Transfer ribbons accordingly may be impregnated with the chromogenous material dispersed in a paraffin oil; or transfer coatings consisting of the chromogenous material, dispersed in a binder of wax or of a paraffin oil may be formed on a web surface to provide transfer sheets. Such a transfer sheet, for example, is placed in a typewriter beneath the master sheet with the transfer coating facing the master sheet. Typing or writing with a stylus then causes a reverse image to be formed of the chromogenous material transferred to the lower master sheet surface, opposite the surface impressed with the types or the stylus. The successive duplicate sheets then are wetted with a solvent liquid in which the phenolic developer substance is dissolved, whereby a duplicate image is formed, on the duplicate sheet surface, of dark-colored material produced by the action of the phenolic substance in the solvent liquid on the portions of the chromogenous compound transferred by the solvent liquid from the master sheet surface to the duplicate sheet surface. The solvent liquid may be, for example, acetone, toluene, benzene, 2-butanone (methyl ethyl ketone), or methyl or ethyl alcohol. The solvent liquid and the binder used for the deposits on the master sheet are chosen so that the binder is not dissolved during successive transfers of portions of the chromogenous material from the master sheet to the duplicate sheets.

In another variation, a predetermined one of the two colorless or lightly colored substances again is used to form the deposits representing the reversed image on the master sheet surface. The procedure is varied, however, by arranging the remaining one of the two substances to be carried on at least one surface of the duplicate sheets, usually as a thin coating of the solid substance in a small amount of an adhesive binder. Then a liquid, such as one of the volatile liquids just mentioned, which is a solvent for the preselected one of the two substances is applied to that surface of the duplicate sheet. The duplicate sheet surface, thus wetted with the solvent liquid, is pressed against the master sheet surface to cause portions of the preselected one of the two substances deposited thereon to dissolve in the liquid and to be transferred into contact with the remaining one of the two substances, carried on the duplicate sheet surface, in the areas representing the image. By this procedure a duplicate image again is formed, on the duplicate sheet surface, of dark-colored material produced by interaction of the two chromogenous and phenolic substances.

In the duplicating method just described, the preselected substance may be the chromogenous compound, in which case the remaining substance, which is the phenolic substance, is carried on each duplicate sheet. Under certain circumstances, however, it may prove to be more feasible to pick the phenolic compound instead as the preselected substance. In preparing the master sheet, the phenolic compound then is transferred in a binder to the master sheet surface in the configuration of the reversed image, and the chromogenous compound is carried on the active surface of each duplicate sheet. Solvent spirits for the phenolic compound are used, such as one of the solvents mentioned above which does not readily affect the binder used in the phenolic deposits. When the active surface of each duplicate sheet is wetted with this solvent liquid and pressed against the master sheet surface, portions of the image-representing deposits of the phenolic substance thereon dissolve in the liquid and are transferred into contact with the chromogenous compound carried on the duplicate sheet surface, causing the dark-colored material to form in the areas on the duplicate sheet surface representing the image to be duplicated.

It appears from the discussion hereinabove that highly useful dark-colored marking materials or dyes are produced, when utilizing the arrangements and methods of the invention, by the action of the phenolic substances disclosed hereinabove on suitable chromogenous compounds, the latter being exemplified by the bis(p-aminophenyl)phthalan cyclic ether compounds, by the triphenylmethane lactones, and by the rhodamine lactone or colorless base compounds and by their cyclic ethers. As compared with the dark forms produced from the lactones by the action of inorganic developer materials, or by the action of weak acids such as acetic acid and tartaric acid, these new dark colors generally are more permanent in nature, have increased resistance to fading under ultraviolet radiation and to loss of color in the presence of moisture, and have improved color intensity.

In the utilization, of applicants' colorforming composition in inks, dyes, manifolding sets, duplicating operations and other applications outlined above, many binder, solvents and carriers may become involved as known in the art. Water soluble solvents, binders and carriers of high polarity should be avoided since they may interfere with the colorforming chemical reaction.

When the chromogenous compounds and phenolic compounds of applicants' colorforming compositions are brought into intimate contact, a dark color results immediately. It has been found, however, that the amount of phenolic compound, by weight, required to secure the most intense color, may be up to approximately three times the amount of chromogenous compound.

In commercial applications of applicants' colorforming composition involving solvents, carriers, and binders, the amount of colorforming composition required to secure a satisfactory color result is a small percentage of the entire mixture. For example, the amount of chromogenous compound in such a mixture could be as low as .1%, with not more than 8% being required to obtain an intense color. For such a combination, the amount of phenolic compound for satisfactory commercial color would range from .3% to approximately 20%. The remainder of such combinations would be suitable solvents, carriers, binders, etc.

It has been discovered that the color reaction of applicants' colorforming combination can be made subject to the application of heat or water by the addition of certain organic solvents to the composition. Such unusual and unexpected characteristics are very useful in the preparation of safety papers or in other technologies wherein the detection of the application of heat or water to the material is desired.

For example, if certain glycol ethers are added to applicants' colorforming composition, the composition is colorless at normal room temperatures. However, if the composition is exposed briefly to a temperature of approximately 150° C. or higher, a stable intense color develops which does not disappear upon cooling. The glycol ether for controlling color appearance in applicants' composition at approximately 150° C. or higher is selected from the group consisting of the methyl and ethyl ethers of mono-, di-, and tri-, ethylene and propylene glycols. The glycol ether also acts as the carrier or solvent in such a composition and the general proportions stated above would be applicable.

On the other hand, if certain glycols are added to applicants' colorforming composition, the composition is colorless at normal room temperature, but an intense color develops upon the application of water. The color disappears upon the evaporation of the water, and will appear and disappear upon successive wetting and drying. The glycol for controlling the appearance of color in applicants' composition, subject to the application of water, is selected from the group consisting of:

ethylene glycol
diethylene glycol
triethylene glycol
tetraethylene glycol
polyethylene glycols ranging in molecular weight up to 400
dipropylene glycol
tripropylene glycol.

Again the proportion of chromogenous compound need not exceed approximately .1% to 8% by weight, with approximately .3% to 20% phenolic compound, with the remainder being one of the listed glycol carriers.

Another unusual characteristic of applicants' colorforming composition develops when the phenolic compound is a liquid or dissolved in a suitable solvent. The intense color of the liquid disappears during application of heat above approximately 130° C., or the melting point of the phenolic compound, if higher, and reappears upon cooling.

In the application of this characteristic, for example, it might be desirable for the phenolic compound to be liquid at room temperature, or dissolved in a suitable solvent, and to have the disappearance of color controlled at approximately 130° C. For such an application the phenolic compound should have a vapor pressure below 3 millimeters of mercury at 130° C. or higher. Of the phenolic compounds described above the following, for example, have such characteristics:

p-phenylphenol dimers
p-phenylphenol trimers
p-octyl phenols
p-nonyl phenols
p-decyl phenols
p-dodecyl phenols
4-chloro-alpha-phenyl-o-cresol
o-(2-biphenylyl) phenol
o-(o-ethylphenyl) phenol
α-(3,4-dichlorophenyl)-p-cresol
2,4-diphenylphenol
2,2'-methylenediphenol
o,o'-biphenol In the latter example, no solvent would be necessary if the phenol is a liquid at room temperature, such as octyl, nonyl, decyl and dodecyl phenols. For phenolic compounds in applicants' composition wherein the melting point lies above room temperature in the illustration, one of the following solvents is preferred: di-, tri- or tetrachlorphenyl ether, chlorinated liquid biphenyls or polyphenyls, alkyl phthalates, alkyl adipates, alkyl azelates, alkyl benzyl phthalates, succinates or citrates. In this composition the solvent should have no inhibiting or other effect on the color formation but merely act as a carrier. The temporary disappearance of color under heat application is a characteristic of the liquid phase or fused melted phase of the phenolic compound.

The various organic solvents listed above for use in color-forming compositions where the appearance or disappearance of color is controllable do not enter into the chemical reaction with the chromogenous and phenolic compounds. The mechanisms by which these and other solvents inhibit, modify or facilitate color formation have been explained by several divergent theories, and consequently the true mechanism cannot be stated with certainty at the present time. However, it appears that physical constants such as viscosity or surface tension of the solvents are not involved, but the degree to which the solvents are polar and hydrophylic does seem to be involved. Those chemically-suitable solvents which have a low vapor pressure perform most satisfactorily because these solvents do not volatilize during application of heat.

Applicants have discovered not only new colorforming composition of matter for customary usage in inks, dyes, duplicating and manifolding arts, but also having unique characteristics which make possible the controlled appearance, or disappearance and reappearance of color under application of heat, or water.

What is claimed is:

1. A colorforming composition of matter comprising a phenolic compound selected from the group consisting of biphenol, bicresol, dibenzylphenol, diethylbiphenol, dipropylbiphenol, diallylbiphenol, dihalobiphenol, biphenyltetrol, terphenyldiol, methylenediphenol, alkylidenediphenol, cycloalkylidenediphenol, methylenediresorcinol, methylenebis (alkylphenol), methylenebis (benzylphenol), methylenebis (phenylphenol), methylenebis (halophenol), methylenebis (trihalophenol), methylenebis (tetrahalophenol), substituted methylenediphenol in which each phenol has two substituents selected from the group consisting of the alkyl, benzyl, phenyl, and halo radicals but in which said two substituents and the linkage to the methylene group do not occupy all of the 2,4,6-positions relative to the phenolic hydroxyl group, thiodiphenol, sulfonyldiphenol, magnesium salt of pentachlorophenol, and a substituted phenol having substituent radicals selected from the group consisting of a single substituent which is one of the alkyl, allyl, halo, halo-substituted alkyl, cycloalkyl, phenyl, halo-substituted phenyl, alkyl-substituted phenyl, biphenyl-yl, benzyl, and alpha-alkylbenzyl radicals of any two substituent radicals and of any three substituent radicals included among said single substituents except when two of said two or three substituent radicals are in the 2,6-positions relative to the phenolic hydroxyl group, of the tetramethyl and tetrahalo radicals, of any of said substituent radicals and said groups of two, three and four substituent radicals with a second hydroxyl radical also on said phenol, of the para-nitro radical, and of the pentamethyl and pentahalo radicals, a colorless or lightly colored chromogenous compound selected from the group consisting of 1,1-bis(p-aminophenyl) phthalan having the structural formula

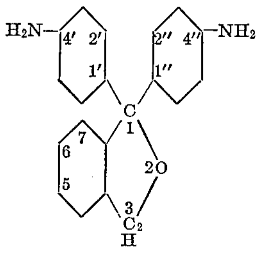

the 2'2''-epoxy, 3-oxo, and 2'2''-epoxy-3-oxo derivatives thereof, bifunctional derivatives of each of said compounds having a second heterocyclic ring

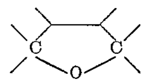

fused to the 5,6 side of the benzene nucleus and similarly carrying extracyclic substituents the same as those carried by the carbon atoms designated 1 and 3, the 5-amino derivatives of said 1,1-bis(p-aminophenyl) phthalan and of said epoxy and oxo derivatives thereof, and N-substituted derivatives of each of said compounds in which each individual substituent for an amino hydrogen atom is selected from the group consisting of alkyl radicals of not more than four carbon atoms, the benzyl radical, and the phenyl radical.

2. The colorforming composition of matter of claim 1 in which the phenolic compound is a p-dodecylphenol.

3. The colorforming composition of matter of claim 1 on which said phenolic compound is magnesium salt of pentachlorophenol;

4. A composition of matter which on heating to approximately 150° C. or higher develops an intens color comprising: a phenolic compound selected from the group consisting of biphenol, bicresol, dibenzylbiphenol, diethylbiphenol, dipropylbiphenol, diallybiphenol, dihalobiphenol, biphenyltetrol, terphenyldiol, methylenediphenol, alkylidenediphenol, cycloalkylidenediphenol, methylenediresorcinol, methylenebis (alkylphenol) methylenebis-(benzylphenol, methylenebis(phenylphenol, methylenebis(halophenol), methylenebis(trihalophenol, methylenebis(tetrahalophenol), subsutituted methylenediphenol in which each phenol has two substituents selected from the group consisting of the alkyl, benzyl, phenyl, and halo radicals but in which said two substituents and the linkage to the methylene group do not occupy all of the 2,4,6-positions relative to the phenolic hydroxyl group, thiodiphenol, sulfonyldiphenol, magnesium salt of pentachlorophenol, and a substituted phenol having substituent radicals selected from the group consisting of a single substituent which is one of the alkyl, allyl, halo, halo-substituted alkyl, cycloalkyl, phenyl, halo-substituted phenyl, alkyl-substituted phenyl, biphenylyl, benzyl, and alphaalkylbenzyl radicals, of any two substituent radicals and of any three substituent radicals included among said single substituents except when two of said two or three substituent radicals are in the 2,6-positions relative to the phenolic hydroxyl group, of the tetramethyl and tetrahalo radicals, of any of said substituent radicals and said groups of two, three, and four substituent radicals with a second hydroxyl radical also on said phenol, of the para-nitro radical, and of the pentamethyl and pentahalo radicals, a colorless or lightly colored chromogenous compound selected from the group consisting of 1,1-bis-(p-aminophenyl) phthalan having the structural formula

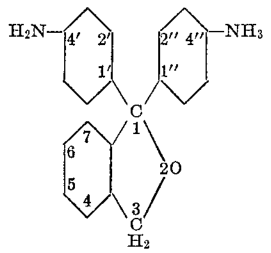

the 2', 2'' - epoxy, 3-oxo, and 2'2'' - epoxy-3-oxo derivatives thereof, bifunctional derivatives of each of said compounds having a second heterocyclic ring

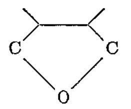

fused to the 5,6 side of the benzene nucleus and similarly carrying extracyclic substituents the same as those carried by the carbon atoms designated 1 and 3, the 5-amino derivatives of said 1, 1-bis(p-aminophenyl) phthaln and of said epoxy and oxo derivatives thereof, and N-substituted derivatives of each of said compounds in which each individual substituent for an amino hydrogen atom is selected from the group consisting of alkyl radicals of not more than four carbon atoms, the benzyl radical, and the phenyl radical, and an organic solvent selected from the group consisting of methyl ether of ethylene glycol, methyl ether of propylene glycol, methyl ether of triethylene glycol, ethyl ether of ethylene glycol, ethyl ether of diethylene glycol, ethyl ether of triethylene glycol, methyl ether of propylene gylcol, methyl ether of dipropylene glycol, methyl ether of tripropylene glycol, ethyl ether of propylene glycol, ethyl ether of dipropylene glycol and ethyl ether of tripropylene glycol.

5. The colorforming composition of matter of claim 4 in which the phenolic compound is a substituted 2,2'-methylenediphenol compound having a substituent in each of the two 4,4'-positions selected from the group consisting of alkyl, benzyl, phenyl, and halo radicals.

6. The colorforming composition of matter of claim 4 in which the phenolic compound is 2,2'-methylenebis (4-chlorophenol) having the structural formula

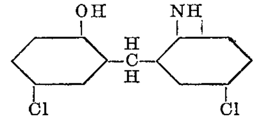

7. A composition of matter which, in combination with water, develops an intense color comprising: a phenolic compound selected from the group consisting of biphenol, bicresole, dibenzylbiphenol, diethylbiphenol, dipropylbiphenol, diallylbiphenol, dihalobiphenol, biphenyltetrol, terphenyldiol, methylenediphenol, alkylidenediphenol, cycloalkylidenediphenol, methylenediresorcinol, methylenebis(alkylphen), methylenebis-(benzylphenol), methylenebis-(phenylphenol), methylenebis(halophenol), methylenebis(trihalophenol), methylenebis(tetrahalophenol), substituted methylenediphenol in which each phenol has two substituents selected from the group consisting of the alkyl, benzyl, phenyl, and halo radicals but in which said two substituents and the linkage to the methylene group do not occupy all of the 2,4-positions relative to the phenolic hydroxyl group, thiodiphenol, sulfonyldiphenol, magnesium salt of pentachlorophenol, and a substituted phenol having substituent radicals selected from the group consisting of a single substituent which is one of the alkyl, allyl, halo, halo-substituted alkyl, cycloalkyl, phenyl, halo-substituted phenyl, alkyl-substituted phenyl, biphenylyl, benzyl, and alphaalkylbenzyl radicals, of any two substituent radicals and of any three substituent radicals included among said single substituents except when two of said two or three substituent radicals are in the 2,6-positions relative to the phenolic hydroxyl group, of the tetramethyl and tetrahalo radicals, of any of said substituent radicals and said groups of two, three, and four substituent radicals with a second hydroxyl radical also on said phenol, of the para-nitro radical, and of the pentamethyl and pentahalo radicals, a colorless or lightly colored chromogenous compound selected from the groups consisting of 1,1-bis(p-aminophenyl)phthalan having the structural formula

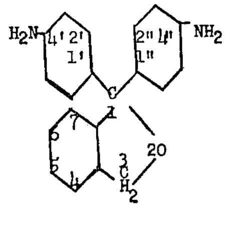

the 2′,2″-epoxy, 3-oxo, and 2′,2″-epoxy-3-oxo derivatives thereof, bifunctional derivatives of each of said compounds having a second heterocyclic ring.

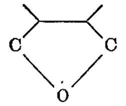

fused to the 5,6 side of the benzene nucleus and similarly carrying extracyclic substituents the same as those carried by the carbon atoms designated 1 and 3, the 5-amino derivatives of said 1,1-bis(p-aminophenyl)phthalan and of said epoxy and oxo derivatives thereof, and N-substituted derivatives of each of said compounds in which each individual substituent for an amino hydrogen atoms is selected from the group consisting of alkyl radicals of not more than four carbon atoms, the benzyl radical, and the phenyl radical, and an organic solvent selected from the group consisting of ethylene glycol, diethylene glycol, triethylene glycol, tetraethylene glycol, polyethylene glycols ranging in molecular weight up to 400, dipropylene glycol and tripropylene glycol.

8. The composition of matter of claim 7 in which the phenolic compound is a substituted 2,2′-methylenediphenol compound having a substituent in each of the two 4,4′-positions selected from the group consisting of the alkyl, benzyl, phenyl, and halo radicals.

9. The composition of matter of claim 7 in which the phenolic compound is 2,2′-methylenebis (4-chlorophenol) having the structural formula

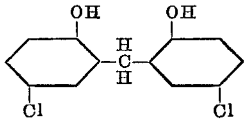

10. The colorforming composition of matter of claim 7 in which the phenolic compound is 4,4′-thiodiphenol having the structural formula

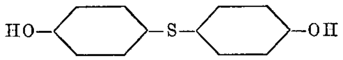

References Cited

UNITED STATES PATENTS

| | | | |
|---|---|---|---|
| 2,374,862 | 5/1945 | Green | 117—36.8 |
| 2,505,471 | 4/1950 | Green | 117—36.2 |
| 2,755,202 | 7/1956 | Balon et al. | 117—36.2 |
| 2,755,203 | 7/1956 | Stallmann | 117—36.2 |
| 2,850,395 | 9/1958 | Green | 117—36.1X |
| 3,020,170 | 2/1962 | Macaulay | 117—36.2X |
| 3,244,548 | 4/1966 | Sullivan | 117—36.2 |
| 3,244,549 | 4/1966 | Farnham et al. | 117—36.2 |
| 3,244,550 | 4/1966 | Farnham et al. | 117—36.2 |
| 3,244,728 | 4/1966 | Johnson et al. | 117—36.2X |
| 3,336,337 | 8/1967 | Gosnell | 117—36.2X |

JULIUS FROME, Primary Examiner

J. B. EVANS, Assistant Examiner

U.S. Cl. X.R.

106—22, 23; 117—36.8

UNITED STATES PATENT OFFICE

CERTIFICATE OF CORRECTION

Patent No. 3,560,229 Dated February 2, 1971

Inventor(s) Norman W. Farnham and Earl J. Gosnell

It is certified that error appears in the above-identified patent and that said Letters Patent are hereby corrected as shown below:

Column 8, line 40, "p.p'" should read --p,p'--.
Column 12, line 3, "cargon" should read --carbon--.
Column 13, lines 37 to 49, the portion of the formula reading "C-OH" should read --C-OH--
O
Column 14, line 48, "fine" should read --find--.
Column 15, line 27, "obtained in this" should read --obtaine in this--.
Column 15, line 34, "groups thus" should read --groups; thus-
Column 17, line 18, "m,m'-biphenyl" should read --m,m'-biphe
Column 17, line 23, "p,p'-biphenyl" should read --p,p'-biphenol--.
Column 19, line 65, "4,4'-methylene-resorcinol" should read --4,4'-methylenediresorcinol--.
Column 21, line 71, "actviity" should read --activity--.
Column 22, lines 57 and 58, "thiodipphenols" should read --thiodiphenols--
Column 22, line 72, "preperties" should read --properties--.
Column 23, line 9, "phenls" should read --phenols--.
Column 24, line 1 "(d') HALOALKYL)PHENOL" should read --(d') (HALOALKYL)PHENOL--.

UNITED STATES PATENT OFFICE
CERTIFICATE OF CORRECTION

Patent No. 3,560,229 Dated February 2, 1971

PAGE - 2

Inventor(s) Norman W. Farnham and Earl J. Gosnell

It is certified that error appears in the above-identified patent and that said Letters Patent are hereby corrected as shown below:

Column 24, line 27, "p-cyclohexylphenyl" should read --p-cyclohexylphenol--.
Column 26, line 40, "a-(2,4" should read --a-(3,4--.
Column 36, line 46, "binder" should read --binders--.
Column 38, line 34, "dibenzylphenol" should read --dibenzylbiphenol--.
Column 38, line 52, "biphenyl-yl" should read --biphenylyl--.
Column 38, line 75, the portion of the formula reading "$C_2$" should read --C --.
H H$_2$
Column 39, line 25, "intens" should read --intense--.
Column 39, line 31, "(alkylphenol) methylene" should read --(alkylphenol), methylene--.
Column 39, line 32, "(benzylphenol," should read --(benzylphenol),--.
Column 39, line 32, "(phenylphenol," should read --(phenylphenol),--.
Column 39, line 33, "(trihalophenol," should read --(trihalophenol),--.
Column 40, line 4, "phthaln" should read --phthalan--.
Column 40, line 12, "propylene glycol" should read --diethylene glycol--.

FORM PO-1050 (10-69) USCOMM-DC 603

UNITED STATES PATENT OFFICE

CERTIFICATE OF CORRECTION

Patent No. 3,560,229 Dated February 2, 1971

Inventor(s) Norman W. Farnham and Earl J. Gosnell PAGE - 3

It is certified that error appears in the above-identified patent and that said Letters Patent are hereby corrected as shown below:

Column 40, line 27, the portion of the formula reading "NH' should read --OH--.
Column 40, line 40, "(alkylphen)," should read --(alkylphenc
Column 40, line 47, "2,4-positions" should read --2,4,6-positions--.
Column 41, line 15, "atoms" should read --atom--.

Signed and sealed this 8th day of June 1971.

(SEAL)
Attest:

EDWARD M.FLETCHER,JR.
Attesting Officer

WILLIAM E. SCHUYLER, JF
Commissioner of Patents